(12) United States Patent
Futaki

(10) Patent No.: US 10,257,756 B2
(45) Date of Patent: Apr. 9, 2019

(54) RADIO COMMUNICATION SYSTEM, RADIO TERMINAL, RADIO STATION, AND CELL SELECTION METHOD

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/412,810

(22) PCT Filed: Jul. 4, 2013

(86) PCT No.: PCT/JP2013/068389
§ 371 (c)(1),
(2) Date: Jan. 5, 2015

(87) PCT Pub. No.: WO2014/007336
PCT Pub. Date: Jan. 9, 2014

(65) Prior Publication Data
US 2015/0156690 A1    Jun. 4, 2015

(30) Foreign Application Priority Data
Jul. 5, 2012  (JP) ................................ 2012-151910

(51) Int. Cl.
H04W 36/00    (2009.01)
H04W 36/08    (2009.01)
H04W 48/20    (2009.01)

(52) U.S. Cl.
CPC ........... *H04W 36/08* (2013.01); *H04W 48/20* (2013.01)

(58) Field of Classification Search
CPC ...... H04W 36/08; H04W 48/20; H04W 88/06
USPC ....... 455/436, 435.2, 411, 452.1, 422.1, 507, 455/524, 522, 63.1, 450, 434, 426.1, 437; 375/260, 262, 265, 267; 370/329, 252,
(Continued)

(56) References Cited

U.S. PATENT DOCUMENTS

2010/0130218 A1    5/2010  Zhang et al.
2010/0216468 A1*   8/2010  Kazmi ................ H04W 48/20
                                                        455/435.3
(Continued)

FOREIGN PATENT DOCUMENTS

CN    101810037 A    8/2010
EP    2048910 A1     4/2009
(Continued)

OTHER PUBLICATIONS

International Search Report corresponding to PCT/JP2013/068389, dated Sep. 17, 2013 (3 pages.)
(Continued)

*Primary Examiner* — Dhaval V Patel
(74) *Attorney, Agent, or Firm* — Wilmer Cutler Pickering Hale and Dorr LLP

(57) ABSTRACT

The present invention is a radio communication system in which a radio station and a radio terminal communicate with each other. The radio communication system has a control means with which at least one of the radio stations controls a plurality of types of cells by using one radio access technology, a recognition means with which the radio terminal recognizes the types of the cells, and a cell selection means with which the radio terminal selects the cell based on cell selection criteria based on the types of the cells.

19 Claims, 12 Drawing Sheets

(58) Field of Classification Search
USPC ....... 370/345, 328, 342, 332, 311, 331, 336, 370/255; 341/144, 155, 183
See application file for complete search history.

(56) References Cited

U.S. PATENT DOCUMENTS

| | | | | |
|---|---|---|---|---|
| 2010/0255836 | A1* | 10/2010 | Chen ................... | H04W 48/18 455/426.1 |
| 2010/0291927 | A1 | 11/2010 | Wu et al. | |
| 2011/0244874 | A1* | 10/2011 | Fodor ................... | H04W 48/18 455/450 |
| 2013/0039342 | A1* | 2/2013 | Kazmi ................. | H04W 48/16 370/331 |
| 2015/0078156 | A1 | 3/2015 | Fodor et al. | |

FOREIGN PATENT DOCUMENTS

| | | |
|---|---|---|
| JP | 2009-290910 A | 12/2009 |
| JP | 2010-147916 A | 7/2010 |
| JP | 2011-151612 A | 8/2011 |
| JP | 2012-511863 A | 5/2012 |
| WO | WO-2009041878 | 4/2009 |

OTHER PUBLICATIONS

3GPP ETSI TS 36 304 V10.5.0, Mar. 2012, pp. 1-34, http://www.3gpp.org/ftp/specs/html-info/36304.htm, section 5.2.

3GPP TS 36.304 V11.0.0, Release 11, "Evolved Universal Terrestrial Radio Access (E-UTRA); User Equipment (UE) Procedures in Idle Mode," Jun. 2012, pp. 15-26.

3GPP TSG RAN WG2 Meeting #76, R2-115666, San Francisco, USA, Nov. 14-18, 2011, 2 pages, http://www.3gpp.org/ftp/tsg_ran/WG2_RL2/TSGR2_76/Docs/R2-115666.zip).

3GPP 3rd Generation Partnership Project; Technical Specification Group Radio Access Network; Evolved Universal Terrestrial Radio Access (E-UTRA); User Equipment (UE) Procedures in Idle Mode (release 11)), 3GPP TS 36.304, V11.0.0, (Jun. 2012), XP050581191, [retrieved Jul. 3, 2012], 33 pages.

Extended European Search Report corresponding to European Application No. 13813837.5, dated Jan. 29, 2016, 13 pages.

LG Electronics Inc. "Inter-carrier Type Cell Reselection", 3GPP TSG-RAN2 Meeting #67, R2-094674, Shenzhen, China, Aug. 24-28, 2009, 3 pages.

Media Tek Inc. "Discussion on Carrier Type Indication for Bandwidth Extension in LTE-Advanced", 3GPP TSG RAN WG1 Meeting #58bis, R1-094059, Miyazaki, Japan, Oct. 12-16, 2009, 4 pages.

Japanese Office Action issued by the Japan Patent Office for Japanese Application No. 2014-523789 dated May 17, 2017 (7 pages).

3GPP TSG RAN WG1 Meeting #69, "CSI-RS based RRM measurement for additional carrier type," Agenda Item: 7.2.2.4, Prague, Czech Republic, May 21-25, 2012 (3 pages).

English translation of Office Action issued in Chinese Application No. 201380042742.4 dated Oct. 9, 2017 (19 pages).

* cited by examiner

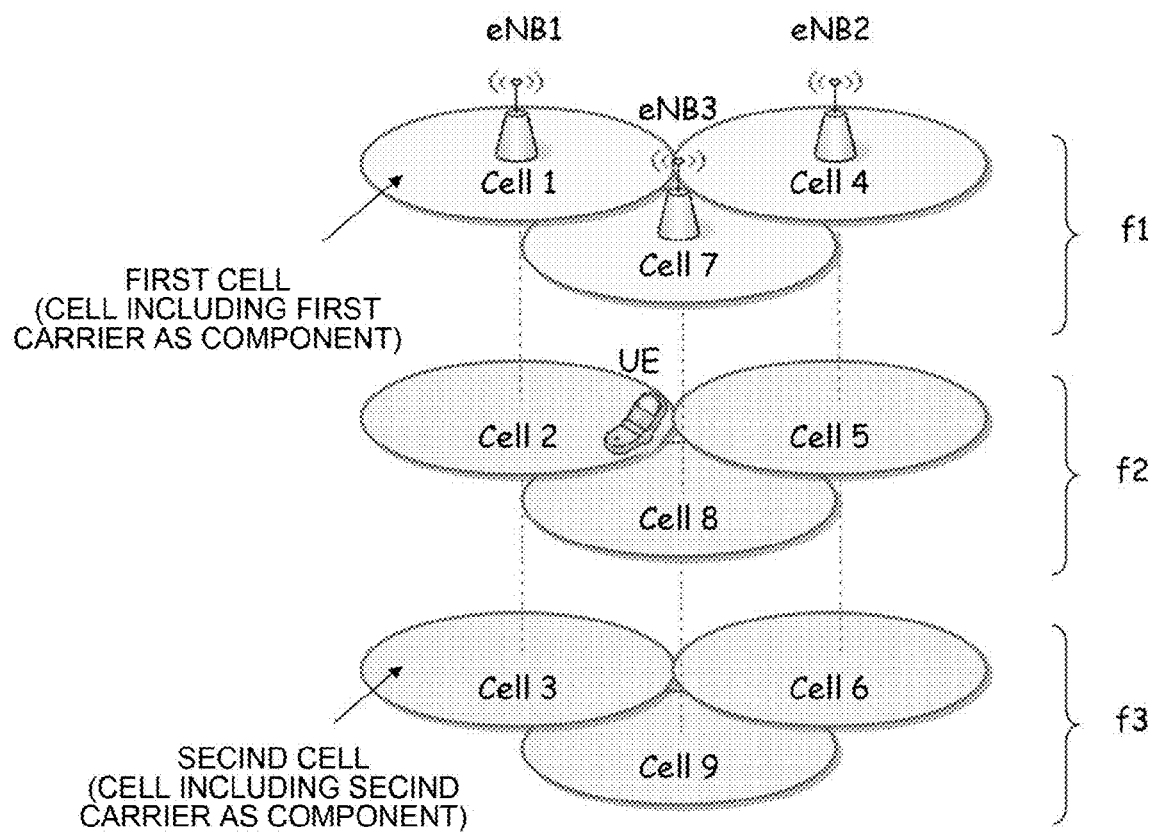

FIG. 8

```
SystemInformationBlockType3 ::=     SEQUENCE {
    cellReselectionInfoCommon       SEQUENCE {
        :
    },
    cellReselectionServingFreqInfo  SEQUENCE {
        s-NonIntraSearch                ReselectionThreshold        OPTIONAL,
        threshServingLow                ReselectionThreshold,
        threshServingLow-r1x            ReselectionThreshold,       OPTIONAL,
        cellReselectionPriority         CellReselectionPriority,
        cellReselectionPriority-r1x     CellReselectionPriority2    OPTIONAL,
    },
    intraFreqCellReselectionInfo    SEQUENCE {
        q-RxLevMin                      Q-RxLevMin,
        q-RxLevMin-r1x                  Q-RxLevMin                  OPTIONAL,
        s-IntraSearch                   ReselectionThreshold        OPTIONAL,
        allowedMeasBandwidth            AllowedMeasBandwidth        OPTIONAL,
        presenceAntennaPort1            PresenceAntennaPort1,
        neighCellConfig                 NeighCellConfig,
        t-ReselectionEUTRA              T-Reselection,
        t-ReselectionEUTRA-r1x          T-Reselection,              OPTIONAL,
        t-ReselectionEUTRA-SF           SpeedStateScaleFactors      OPTIONAL
    },
    ...,
    lateNonCriticalExtension        OCTET STRING                    OPTIONAL,
    [[ s-IntraSearch-v920            SEQUENCE {
        :
       }                                                            OPTIONAL,
       :
       q-QualMin-r9                    Q-QualMin-r9                OPTIONAL,
       q-QualMin-r1x                   Q-QualMin-r9                OPTIONAL,
       :
       threshServingLowQ-r9            ReselectionThresholdQ-r9    OPTIONAL
       threshServingLowQ-r1x           ReselectionThresholdQ-r9    OPTIONAL
    ]]
}
```

FIG. 9

```
SystemInformationBlockType5 ::=      SEQUENCE {
    interFreqCarrierFreqList         InterFreqCarrierFreqList,
    ...,
}
InterFreqCarrierFreqList ::=         SEQUENCE (SIZE (1..maxFreq)) OF InterFreqCarrierFreqInfo
InterFreqCarrierFreqInfo ::=         SEQUENCE {
    dl-CarrierFreq                   ARFCN-ValueEUTRA,
    q-RxLevMin                       Q-RxLevMin,
    q-RxLevMin-r1x                   Q-RxLevMin,              OPTIONAL,
    p-Max                            P-Max                    OPTIONAL,
    t-ReselectionEUTRA               T-Reselection,
    t-ReselectionEUTRA-r1x           T-Reselection,           OPTIONAL,
    t-ReselectionEUTRA-SF            SpeedStateScaleFactors   OPTIONAL,
    threshX-High                     ReselectionThreshold,
    threshX-High-r1x                 ReselectionThreshold,    OPIONAL,
    threshX-Low                      ReselectionThreshold,
    threshX-Low-r1x                  ReselectionThreshold,    OPTIONAL,
    allowedMeasBandwidth             AllowedMeasBandwidth,
    presenceAntennaPort1             PresenceAntennaPort1,
    cellReselectionPriority          CellReselectionPriority  OPTIONAL,
    cellReselectionPriority-1rx      CellReselectionPriority2 OPTIONAL,
    neighCellConfig                  NeighCellConfig,
    q-OffsetFreq                     Q-OffsetRange            DEFAULT d80,
    q-OffsetFreq-r1x                 Q-OffsetRange            OPTIONAL,
    interFreqNeighCellList           InterFreqNeighCellList   OPTIONAL,
    interFreqBlackCellList           InterFreqBlackCellList   OPTIONAL,
    ....
    [[ q-QualMin-r9                  Q-QualMin-r9             OPTIONAL,
       threshX-Q-r9                  SEQUENCE {
           threshX-HighQ-r9              ReselectionThresholdQ-r9,
           threshX-HighQ-r1x             ReselectionThresholdQ-r9,  OPTIONAL
           threshX-LowQ-r9               ReselectionThresholdQ-r9,
           threshX-LowQ-r1x              ReselectionThresholdQ-r9   OPTIONAL
       }                                                            OPTIONAL
    ]]
}
```

RADIO COMMUNICATION SYSTEM, RADIO TERMINAL, RADIO STATION, AND CELL SELECTION METHOD

CROSS-REFERENCE TO RELATED APPLICATIONS

This application is a national stage application of International Application No. PCT/JP2013/068389 entitled "Radio Communication System, Radio Terminal, Radio Station, and Cell Selection Method," filed on Jul. 4, 2013, which claims the benefit of the priority of Japanese Patent Application No. 2012-151910, filed on Jul. 5, 2012, the disclosures of each of which are hereby incorporated by reference in their entirety.

TECHNICAL FIELD

The present invention relates to a radio communication system in which a radio station and a radio terminal each have a function to control a plurality of types of cells by using a specific radio access technology.

BACKGROUND ART

In an LTE (Long Term Evolution) being one standard of a radio communication system regulated by 3GPP (3rd Generation Partnership Project), a radio terminal (User Equipment: UE) selects one cell formed by a downlink (Downlink: DL) component carrier (hereinafter, referred to as a DL carrier) and an uplink (Uplink: UL) component carrier (hereinafter, referred to as a UL carrier) associated with the DL carrier, and performs communication with a radio base station (evolved Node B: eNB) in the cell. Further, a selection of the cell of the radio terminal (UE) basically corresponds to that of the DL carrier. In the LTE, by using the DL carrier, the radio base station (eNB) periodically transmits a reference signal (Cell specific Reference Signal: CRS), a synchronization signal (Synchronization Signal: SS), system information (System Information: SI), and the like that are mutually used by the radio terminals (UEs) within the cell. In the LTE, the above signals and information are signals and information needed when the radio terminal (UE) selects the cell. Further, a transmission configuration (for example, a transmission period or a signal arrangement) is regulated so as to satisfy predetermined conditions.

A cell selection method and a cell reselection method of the radio terminal (UE) in the idle state (Radio Resource Control (RRC) Idle) in the LTE will be described with reference to FIG. 12. In the cell selection of the radio terminal (UE) in the idle state (RRC_Ldle), in accordance with a capability of a radio frequency unit, the radio terminal (UE) searches (scans) in all frequencies in a frequency band of E-UTRA (Evolved-Universal Terrestrial Radio Access) supported by the radio terminal (UE) itself.

In FIG. 12, when having a capability of detecting the cell by using a frequency 1 (f1), a frequency 2 (f2), and a frequency 3 (f3), the radio terminal (UE) tries to detect a suitable cell by using all of the f1 to f3. In each frequency, the radio terminal (UE) may search a strongest cell (for example, a cell in which a detection level of CRS is highest, received power of CRS (RSRP) is largest, or received quality of CRS (RSRQ) is highest). On the other hand, when the radio terminal (UE) has information about cell parameters or information about frequency indicated by previously-received measurement control information, the above information may be used. In this case, the entire frequency band of E-UTRA supported by the radio terminal (UE) need not be searched.

When a suitable cell is found out, the radio terminal (UE) selects the cell and camps on the cell. FIG. 12 illustrates a situation in which the radio terminal (UE) selects a Cell 2. Here, the suitable cell is a cell that satisfies predetermined cell selection criteria, and on which the radio terminal (UE) is permitted to camp (and access the radio base station (eNB)). As the predetermined cell selection criteria, it is specified that minimum received power or minimum received quality necessary for camping is satisfied (Non-Patent Literature 1). A start of search from which frequency band depends on policies of designing of the radio terminal (UE). Further, information about a frequency band in the cell on which the radio terminal (UE) previously camps may be stored and the search may be started from the frequency band.

The cell reselection method of the radio terminal (UE) in the idle state (RRC_Ldle) will be described.

First, the cell reselection to a cell of the same frequency is started from ranking for any cell(s) that satisfy the cell selection criteria. When an offset value of neighbouring cells to the serving cell is indicated by using broadcast information from the radio base station (eNB), the radio terminal (UE) performs ranking in consideration of the offset value. Further, the radio terminal (UE) selects the cell that satisfies predetermined first cell reselection criteria for the cell ranked as a best cell (best cell). As the first cell reselection criteria, it is specified that one or more seconds have elapsed since the radio terminal (UE) camped on the current serving cell and a target cell (a candidate of a new serving cell) is ranked upper than the serving cell for a predetermined period. When the cell that satisfies the criteria is not present, or when the serving cell is ranked as the best cell, the cell reselection is not performed. In order that an unnecessary measurement may be prevented from being performed, when received power or received quality of the cell (serving cell) during the camping becomes smaller than a predetermined threshold, the radio terminal (UE) may perform the measurement.

Next, control of the cell reselection with respect to a cell of the frequency different from that of the serving cell or control of the cell reselection with respect to a cell of different radio access technology (Radio Access Technology: RAT) is performed in accordance with any one of the following items.

1) Cell reselection to neighbouring cell of the LTE or another RAT, having higher priority:

When a frequency that is higher than the frequency of the serving cell and to which a cell reselection priority is allocated is present, the radio terminal (UE) performs measurement (Inter-frequency measurement) of the cell in the LTE of the frequency, or performs measurement (Inter-RAT measurement) of the cell of another RAT. Further, the radio terminal (UE) selects the cell that satisfies predetermined second cell reselection criteria. As the second cell reselection criteria, it is specified that one or more seconds have elapsed since the radio terminal (UE) camped on the current serving cell, and a situation in which received power or received quality of the cell is larger than respective decision threshold has been continued for a predetermined period.

2) Cell reselection to neighbouring LTE cell having the same priority:

The measurement (Inter-frequency measurement) of the cell in the LTE of a frequency allocated the same cell reselection priority as the frequency of the serving cell is performed, and the cell that satisfies the predetermined third cell reselection criteria is selected. The third cell reselection criteria are the same as the above-described cell selection criteria, and a candidate cell for the cell reselection is a cell in the LTE of different frequency.

3) Cell reselection to neighbouring cell of the LTE or another RAT, having lower priority:

The measurement (Inter-frequency measurement) of the cell in the LTE of a frequency allocated a lower cell reselection priority than the frequency of the serving cell, or the measurement (Inter-RAT measurement) of the cell of another RAT of a frequency allocated a lower cell reselection priority than the frequency of the serving cell is performed, and the cell that satisfies the predetermined fourth cell reselection criteria is selected. As the fourth cell reselection criteria, it is specified that one or more seconds have elapsed since the radio terminal (UE) camped on the current serving cell, and a situation in which received power or received quality of the serving cell is smaller than a decision threshold and received power or received quality of neighbouring cells is larger than another decision threshold has been continued for a predetermined period.

Further, the cell reselection priority is broadcast by using system information (System Information), or is informed by using a radio terminal (UE) individual signal (Dedicated Signaling).

Through the control as described above, the radio terminal (UE) in the idle state (RRC_Idle) is capable of performing a suitable cell selection and cell reselection.

On the other hand, in 3GPP, LTE-Advanced, where the LTE is enhanced and a function is largely extended, is studied. In the LTE, in addition to the reference signal (Cell specific Reference Signal: CRS), the radio base station (eNB) transmits also a reference signal (Demodulation RS: DM-RS) for demodulating user data, a reference signal (CSI-RS) for measuring or calculating a communication path state information (Channel State Information: CSI) of a downlink, a downlink physical control channel (Physical Downlink Control Channel: PDCCH) including scheduling information, and the like. In a study of the LTE-Advanced, it is pointed out that an overhead of the above-described signals or information other than downlink user data is large and usage of downlink radio resources is not optimized. For the purpose of improving downlink throughput or cell capacity, the overhead is studied to be reduced. For example, a method for reducing the number of symbols of the reference signal (CRS) for transmission per sub-frame (Sub-frame), reducing the number of sub-frames (Subframes) for transmitting the reference signal (CRS), or not absolutely transmitting the reference signal (CRS) is studied. Further, a type of the above DL carrier is called a New Carrier Type (NCT) (Non-patent literature 2). Hereinafter, with respect to a conventional component carrier (Legacy Component Carrier: LCC), the component carrier of the NCT is called a New Type Component Carrier (NTCC). The NTCC is supposed to be used as a secondary component carrier (Secondary Component Carrier: SCC) (also called a Secondary Cell (SCell)) of a carrier aggregation (Carrier Aggregation: CA) by which the radio terminal (UE) uses a plurality of component carriers at the same time and performs communication with the radio base station (eNB). Here, a component carrier (cell) in which the radio terminal (UE) establishes a connection to the radio base station (eNB) and acquires basic information such as security information is called a primary component carrier (Primary Component Carrier: PCC)/primary cell (Primary Cell: PCell). Further, an additional component carrier/cell that is used together with the primary component carrier/primary cell (PCC/PCell) is called the secondary component carrier/secondary cell (SCC/SCell). It can be expected that radio resources for transmitting downlink user data are increased in the secondary component carrier/secondary cell (SCC/SCell) and downlink throughput or cell capacity is improved through an introduction of DL NTCC. Further, power saving of a radio network can be also expected.

CITATION LIST

Non-Patent Literature

Non-patent literature 1: 3GPP TS36.304v10.5.0 (Internet <URL> http://www.3gpp.org/ftp/Specs/html-info/36304.htm), section 5.2

Non-patent literature 2: 3GPP R2-115666 (Internet <URL> http://www.3gpp.org/ftp/tsg_ran/WG2_RL2/TSGR2_76/Docs/R2-115666.zip

SUMMARY OF INVENTION

Technical Problem

Hereinafter, related technologies according to the present invention are analyzed.

With regard to an introduction of DL New Carrier Type (NCT) in the LTE-Advanced, the DL New Carrier Type (NCT) is supposed to be used as a secondary carrier (SCC)/secondary cell (SCell) during the carrier aggregation (Carrier Aggregation: CA). On the other hand, it is expected from a standpoint of an effective utilization of radio resources that a component carrier (New Type Component Carrier: NTCC) of NCT is used as a primary carrier (PCC)/primary cell (PCell). However, when the above-described NTCC is applied to PCC/PCell, several problems as described below may arise.

First, in an initial stage in which PCell formed by the NTCC is introduced (hereinafter, referred to as an NTCC PCell), a proportion of the number of the radio terminals (UEs) that are capable of using the NTCC PCell in the number of all the radio terminals (UEs) in the cell is supposed to be comparatively small. Further, the radio terminals (UEs) in the idle state (RRC_Idle) are supposed to be concentrated in the PCell formed by conventional component carriers (hereinafter, referred to as a Legacy PCell).

Suppose, for example, that in FIG. 12, f1 and f2 are configured to the Legacy PCell and f3 is configured to the NTCC PCell. In this case, the radio terminals (UEs) that are capable of using the NTCC PCell are distributed to cells of f1 to f3, and the radio terminals (UEs) that are not capable of using the NTCC PCell are distributed to cells of f1 and f2. Therefore, depending on the rate of the radio terminals (UEs) that are capable of using the NTCC PCell, the radio terminals (UEs) are concentrated in the cells of f1 and f2. As a result, there arises a problem that processing of the radio connection establishment procedure (RRC Connection Setup Procedure) including the radio connection request (RRC Connection Request) for changing the radio terminal (UE) into the active state (RRC_Connected) from the idle state (RRC_Idle) is concentrated.

Suppose, on the other hand, that a ratio of the radio terminals (UEs) that are capable of using the NTCC PCell becomes dominant and a ratio of the radio terminals (UEs) that are not capable of using the NTCC PCell decreases. In this case, the ratio of the Legacy PCell is reduced, and thereby it is expected that an effect due to an introduction of the NTCC PCell is improved.

However, there may arise the above-described same problem that when a ratio between the Legacy PCell and the NTCC PCell is not appropriately configured, the radio terminals (UEs) in the idle state (RRC_Idle) are concentrated in the Legacy PCell. In addition, it is predicted that the ratio of the radio terminals (UEs) that are capable of using the NTCC PCell changes based on location and time, and therefore it is considered that it is difficult to appropriately configure the ratio between the Legacy PCell and the NTCC PCell.

Accordingly, the problem to be solved is that cells on which the radio terminals (UEs) in the idle state (RRC_Idle) camp are appropriately distributed.

Solution to Problem

The present invention is directed to a radio communication system in which a radio station and a radio terminal communicate with each other, including a control means with which at least one of the radio stations controls a plurality of types of cells by using one radio access technology, a recognition means with which the radio terminal recognizes a type of a cell, and a cell selection means with which the radio terminal selects the cell based on cell selection criteria according to the type of the cell.

The present invention is directed to a radio terminal for use in a radio communication system in which a radio station controls a plurality of types of cells by using one radio access technology, including a recognition means that recognizes a type of a cell, and a cell selection means that selects the cell based on a cell selection criteria according to the type of the cell.

The present invention is directed to a radio station including a control means that controls a plurality of types of cells by using one radio access technology, and a means that broadcasts or individually transmits cell selection criteria to be criteria when a radio terminal selects the cell, wherein the cell selection criteria are configured in accordance with a type of a cell.

The present invention is directed to a cell selection method including causing at least one radio station to control a plurality of types of cells by using one radio access technology, causing a radio terminal to recognize a type of a cell, and causing the radio terminal to select the cell based on cell selection criteria according to the type of the cell.

Advantageous Effects of Invention

According to the present invention, the cells on which the radio terminals (UEs) in the idle state (RRC_Idle) camp are appropriately distributed. As a result, processing of the connection establishment procedure (RRC Connection Setup Procedure) including the connection request (RRC Connection Request) for changing the radio terminal (UE) into the active state (RRC_Connected) from the idle state (RRC_Idle) can be prevented from being concentrated in the specific cell.

BRIEF DESCRIPTION OF DRAWINGS

FIG. 7 is another system diagram illustrating a cell selection and a cell reselection by the radio terminal according to a third example of the present invention.

FIG. 8 illustrates a transmission configuration of a parameter used for the cell selection and the cell reselection by the radio terminal according to the third example of the present invention.

FIG. 9 illustrates another transmission configuration of a parameter used for the cell selection and the cell reselection by the radio terminal according to the third example of the present invention.

DESCRIPTION OF EMBODIMENTS

First Embodiment

In an embodiment of the present invention, a first radio communication system including a radio station (for example, a radio base station, a base station control station, and other network entity) and a radio terminal as components is used as an example, and descriptions will be made.

In a first embodiment, in a radio system in which different types of cells are mixed, a radio terminal selects a cell (or another predetermined camping area) in consideration of a type of the cell, and thereby the cells of the radio terminal are appropriately distributed.

Figure 1:
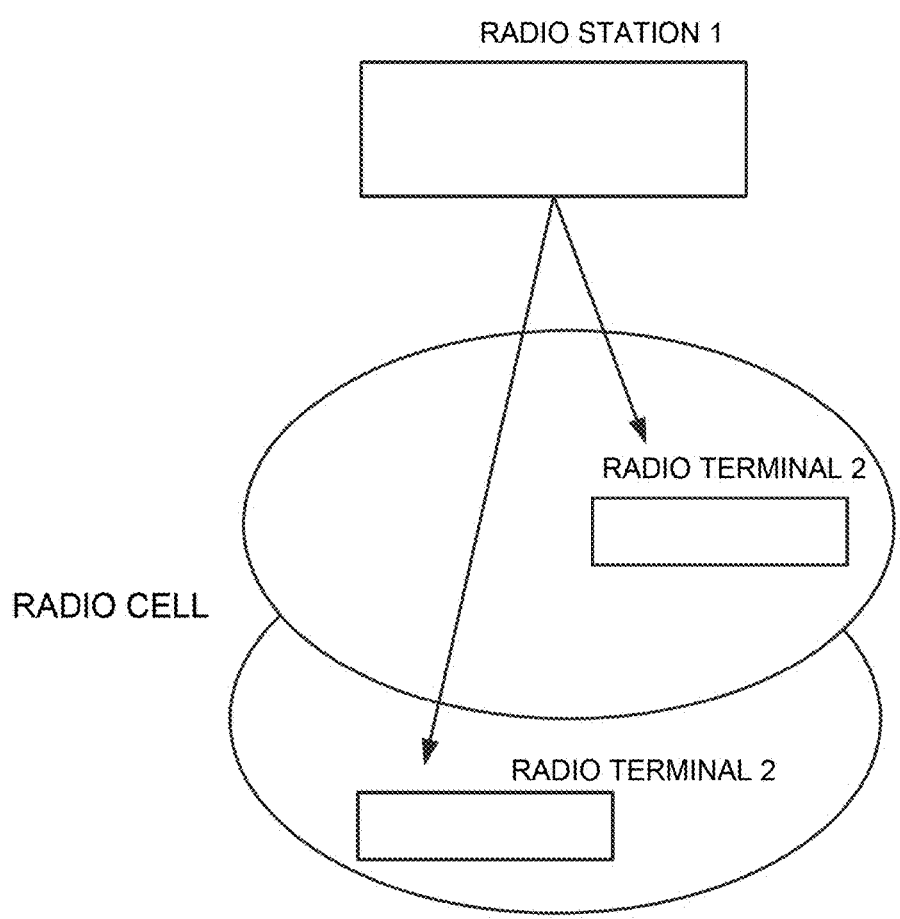
FIG. 1 is a schematic diagram illustrating a radio system according to a first embodiment of the present invention.

FIG. 1 is a block diagram illustrating the first embodiment of the present invention.

In the first embodiment of the present invention, in the first radio communication system, at least a part of radio station 1 has a control means to control a plurality of types of cells by using one radio access technology (Radio Access Technology: RAT), at least a part of radio terminal (UE) 2 has a recognition means to recognize the type of the cells, and a cell selection means to select the cell based on cell selection criteria according to the types of the cells. The selection of the cell includes operations of a cell selection and/or a cell reselection to be performed in an idle state in which a radio connection between the radio terminal (UE) 2 and the radio station 1 is not established. The idle state herein said includes a standby mode in which the radio terminal (UE) 2 does not communicate with the radio station 1. In addition, for example, the following matters are considered as the cell selection criteria.

A decision threshold related to the cell selection or the cell reselection

An offset value related to the cell selection or the cell reselection

Priority related to the cell selection or the cell reselection

A combination of the above

Here, the decision threshold is, for example, a threshold for a decision reference used for an extraction of selection candidates and/or a final selection. The offset value is, for example, an offset value for a decision reference used for an extraction of selection candidates and/or a final selection. The priority is, for example, priority between the selection candidates to be considered at the time of performing a final selection from the selection candidates and/or a searching order of the selection candidates. Further, for example, received power and/or received quality of known signals is considered as the decision reference. However, the decision reference is not limited thereto. The cell selection criteria based on a type of the cells may be transmitted from the radio station 1 to the radio terminal (UE) 2 as broadcast information, may be informed by using individual signals, or may be preconfigured to the radio terminal (UE) 2.

As types of the cells, for example, the following matters are considered.

A cell to which a conventional (legacy) radio terminal (UE) is accessible

A cell to which only a radio terminal (UE) having a specific capability (or function) is accessible A cell to which a conventional (legacy) radio terminal (UE) is accessible only for a specific usage Here, the conventional (legacy) radio terminal (UE) is, for example, a radio terminal (UE) that has no function to perform a selection of the cell based on the cell selection criteria according to the type of the cell (or the carrier). On the other hand, the specific capability (or function) is, for example, a capability (or function) to perform a selection of the cell (namely, a cell selection or a cell reselection) based on the cell selection criteria according to the type of the cell (or the carrier). It may be considered that the specific usage is, for example, to use the cell (or carrier) as an additional cell (or an additional carrier) in the case of performing communication with using a plurality of cells (or carriers) at the same time.

On the other hand, processing for selecting the cell by the radio terminal (UE) 2 is basically equivalent to processing for selecting a downlink carrier (and an uplink carrier associated with the downlink carrier) in which the radio station 1 transmits. Therefore, it goes without saying that "the cell selection criteria according to the type of the cell" can be said to be "the cell selection criteria according to the type of the carrier" (namely, "the cell selection criteria according to the type of the cell" is considered to be replaced by "the cell selection criteria according to a type of the carrier").

Further, from the same standpoint, it goes without saying that the type of the cell is identified by the type of the carrier as a component of the cell. The type of the carrier is classified based on a predetermined characteristic related to a transmission configuration of signals transmitted by the carrier. As the predetermined characteristic, for example, the following matters are considered.

A configuration of physical channels

A transmission configuration of the known signals transmitted by the radio station A transmission configuration of the control signals transmitted by the radio station A transmission configuration of system information transmitted by the radio station Contents of the system information transmitted by the radio station A radio transmission scheme A duplex mode As the configuration of the physical channels, it is also called a sub-frame format or a frame format of the downlink or the uplink and, for example, mapping of the physical channels, namely, an allocation method of radio resources used in transmission of each physical channel is considered.

The known signal is called a reference signal or a pilot signal. As the transmission configuration of the known signal, for example, a transmission period, a transmission band, a transmission density, a signal power density, a signal arrangement, a signal sequence, the number of transmission antennas, and a type of the known signal are considered.

As contents of the system information, information transmitted regardless of the type of the carrier and information transmitted only by a specific type of the carrier are considered.

Examples of the radio transmission scheme include an OFDM, an OFDMA, an SC-FDMA, a CDMA, an FDMA, and a TDMA.

Examples of the Duplex mode include a Full-Duplex mode, a Half-Duplex mode, an FDD (Frequency Division Duplex) mode, and a TDD (Time Division Duplex) mode.

Further, the control of the cell in the control means of the radio station 1 means that, for example, the radio station 1 performs communication with the radio terminal (UE) 2 by using a certain type of the carrier for the downlink and/or the uplink as a component of the cell. Further, the recognition of the type of the cell in the recognition means of the radio terminal (UE) 2 means that, for example, the radio terminal (UE)2 knows or is aware of the type of the cell on which the radio terminal (UE) 2 camps. Further, it may be also considered that the radio terminal (UE) 2 knows or is aware of the type of the downlink carrier as a component of the cell and/or the type of the uplink carrier of said cell.

As described above, the radio terminal (UE) 2 in an idle state recognizes the type of the cell (or the carrier), and performs a cell selection or a cell reselection based on the cell selection criteria according to the type of the cell (or the carrier). As a result, the radio terminal (UE) 2 in the idle state can be appropriately distributed.

Suppose, for example, that a first cell formed by a type of the carrier (first carrier) that can be used by all the radio terminal (UEs) 2 in the system and a second cell formed by a type of the carrier (second carrier) (namely, at least one of downlink carrier and uplink carrier is the second carrier) that can be used by only a part of the radio terminals (UEs) 2 are mixed. In this case, there may arise a problem that when the cell selection or the cell reselection is performed out of consideration of the type of the cell (or the carrier) like a conventional technology, the radio terminals (UEs) 2 in the idle state are concentrated in the first cell. However, according to the present invention, the radio terminals (UEs) 2 in the idle state can be appropriately dispersed (distributed) in the first cell and the second cell. As a result, when the radio terminal (UE) 2 in the idle state becomes active, concentration of a Radio Connection Setup Procedure including a Radio Connection Request and concentration of subsequent traffics can be prevented.

First Example

Figure 2:
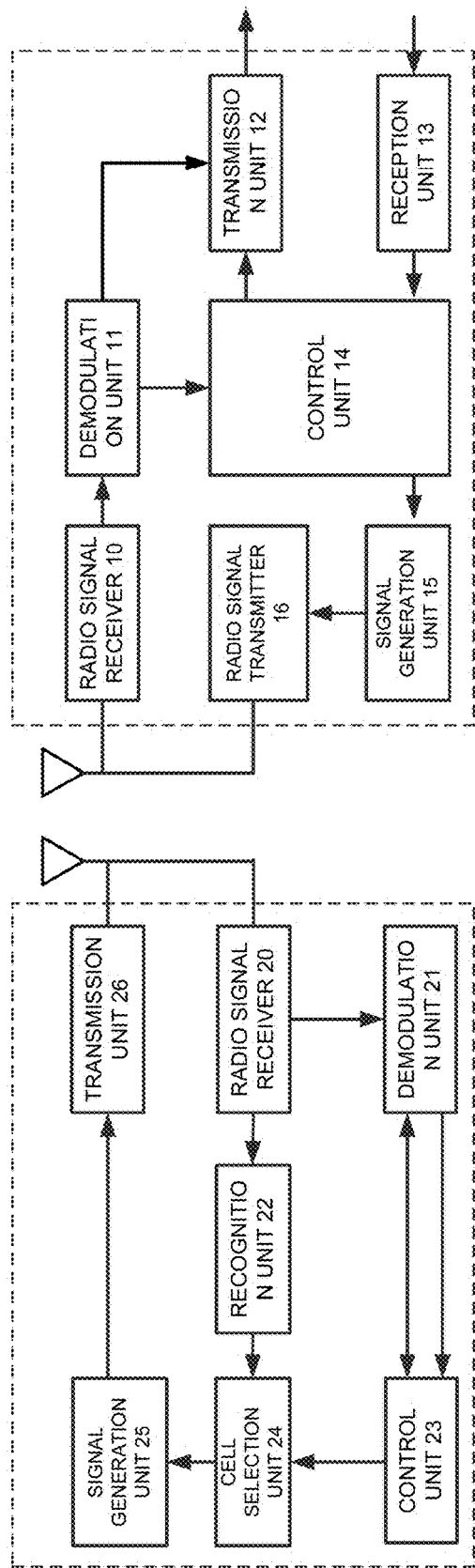
FIG. 2 is a block diagram illustrating a radio station and a radio terminal according to the first embodiment of the present invention.

FIG. 2 is a block diagram illustrating the radio station 1 and the radio terminal (UE) 2 of the present invention.

In FIG. 2, the radio station 1 is configured by a radio signal receiver (Radio Signal Receiver) 10 that receives radio signals from the radio terminal (UE) 2, a demodulation unit (Demodulator) 11 that demodulates signals received from the radio terminal (UE) 2, a transmission unit (Transmitter) 12 that transmits signals to other network nodes (Other Network Node), a reception unit (Receiver) 13 that receives signals from other network nodes (Other Network Node), a control unit (Controller) 14 that has a function to control a plurality of types of cells by using one radio access technology (Radio Access Technology: RAT) and controls operations of the radio station such as transmission and reception of signals, a signal generation unit (Tx signal generator) 15 that generates signals to the radio terminal (UE), and a radio signal transmitter (Radio Signal Transmitter) 16 that transmits radio signals to the radio terminal (UE) 2. In addition, as the radio station 1, a radio base station or a base station control station that manages the radio base station or the like are considered.

Further, in FIG. 2, the radio terminal (UE) 2 is configured by a radio signal receiver (Radio Signal Receiver) 20 that receives radio signals from the radio station 1, a demodulation unit (Demodulator) 21 that demodulates received signals, a recognition unit 22 that recognizes the type of the cell, a control unit (Controller) 23 that controls terminal operations such as transmission and reception of signals, a cell selection unit 24 that selects the cell based on the cell selection criteria according to the type of the cell, a signal generation unit (Tx signal generator) 25 that generates signals to the radio station 1, and a radio signal transmitter (Radio Signal Transmitter) 26 that transmits radio signals to the radio station 1.

A configuration of the functional block illustrated in FIG. 2 is one example, and an application of the present invention is not limited to the above configuration.

Figure 3:
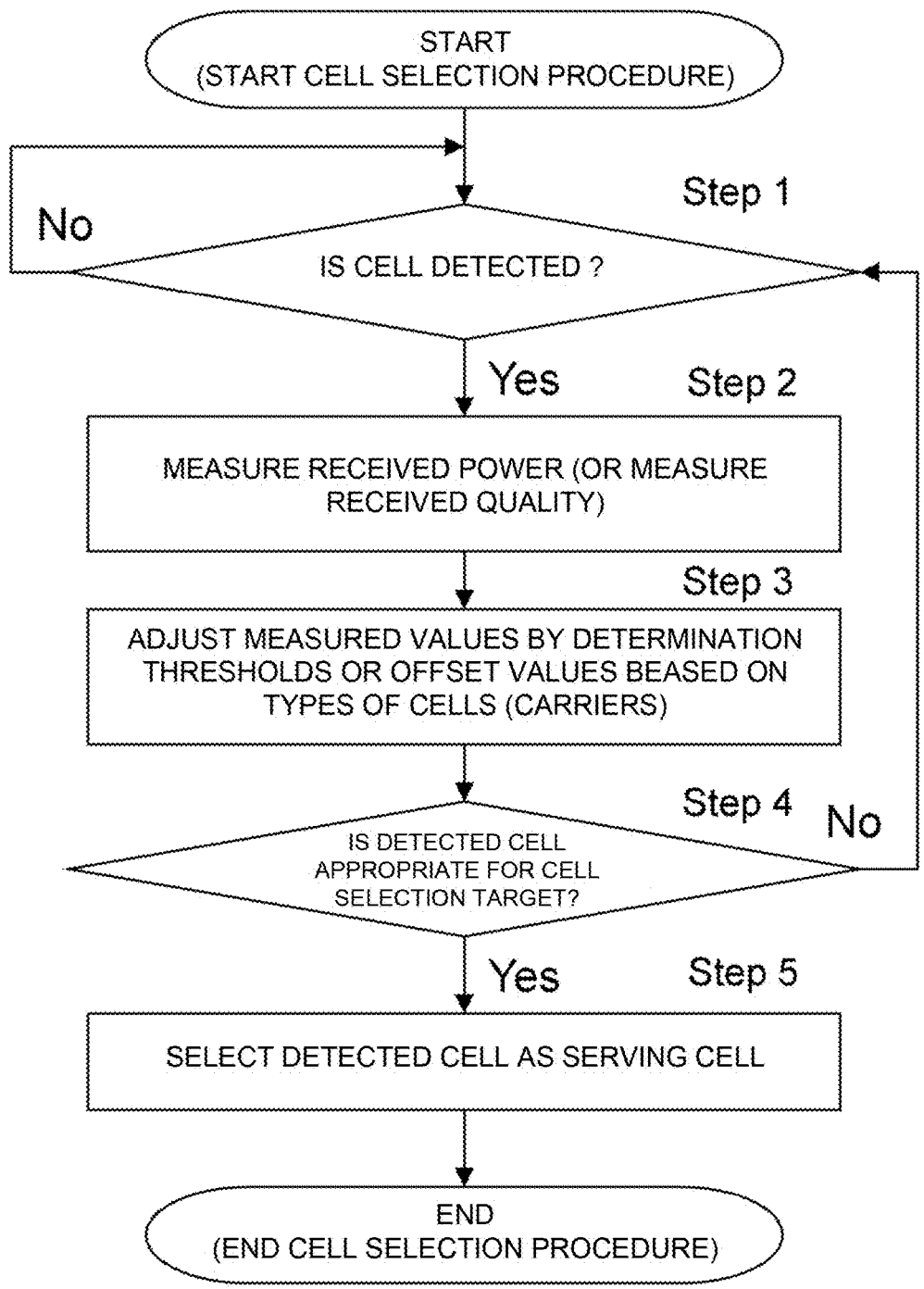
FIG. 3 is a flowchart of a cell selection by the radio terminal according to a first example of the present invention.

FIG. 3 is a flowchart illustrating a procedure of a cell selection by the recognition unit 22 and the cell selection unit 24 of the radio terminal (UE) 2 of the present invention.

First, when the cell selection is triggered, for example, upon power-on, the radio terminal (UE) 2 performs a cell search operation by using a predetermined method (Step 1). At this time, the radio terminal (UE) 2 searches from a strongest cell (also called a best cell) and in descending order.

The radio terminal (UE) 2 performs a received power measurement (or a received quality measurement) of the detected cell (Step 2). Further, the radio terminal (UE) 2 adjusts a value of the measured received power (or received quality) based on the cell selection criteria (for example, the decision threshold or the offset value) according to the type of the detected cell (or the carrier (of the downlink)) (Step 3).

Further, the radio terminal (UE) 2 determines whether the detected cell is suitable for a cell selection target (Step 4). If the detected cell is suitable for the cell selection target (Yes at Step 4), the detected cell is selected (Step 5). That is, the radio terminal (UE) 2 selects the detected cell as a serving cell and camps on the cell. On the other hand, if the detected cell is not suitable for the cell selection target (No at Step 4), the radio terminal (UE) 2 repeats operations from the cell search operation.

Second Example

Figure 4:
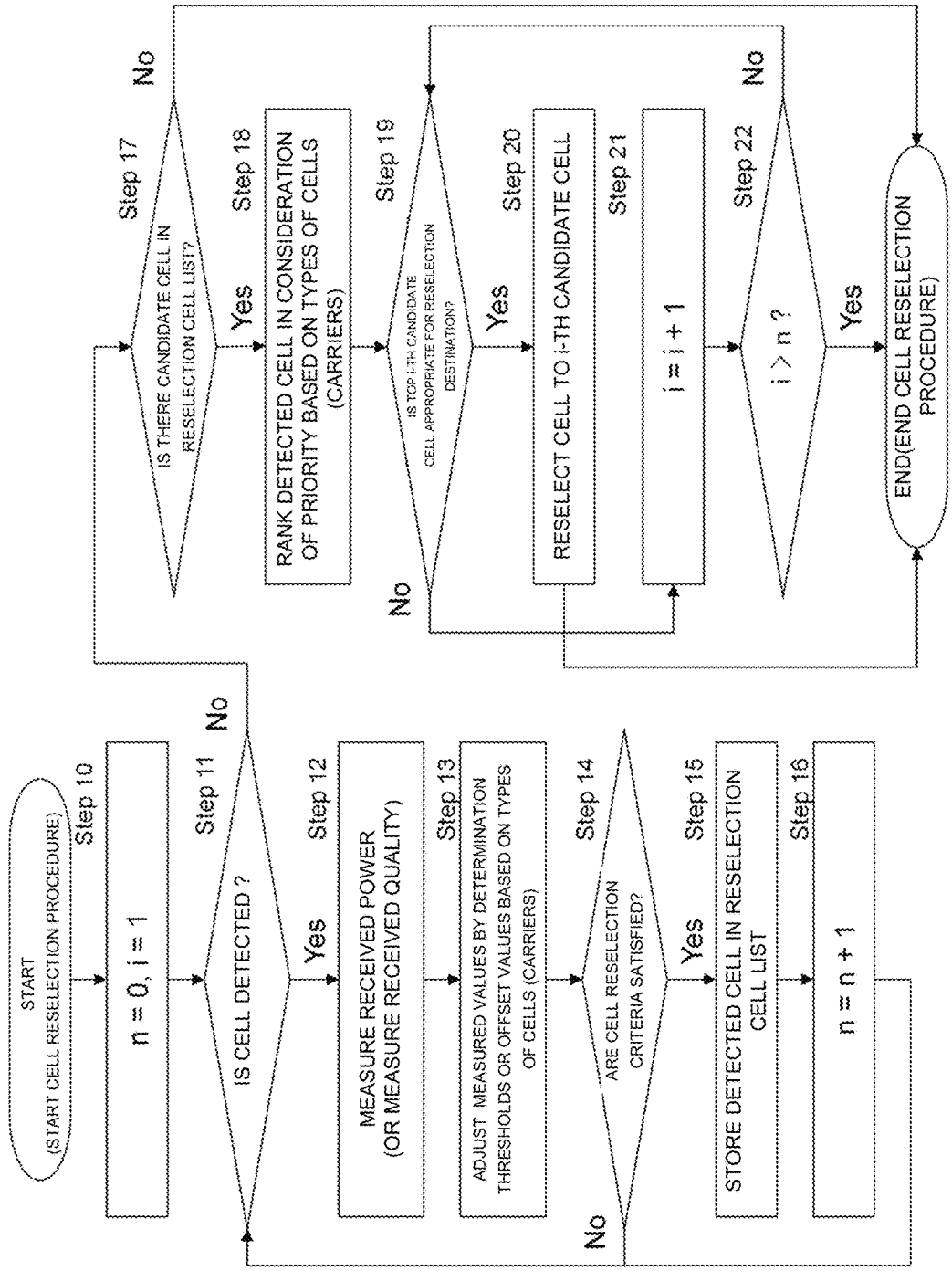
FIG. 4 is a flowchart of a cell reselection by the radio terminal according to a second example of the present invention.

FIG. 4 is a flowchart illustrating a procedure of the cell reselection according to the recognition unit 22 and the cell selection unit 24 of the radio terminal (UE) 2 of the present invention. Further, when the cell selection criteria are equal to criteria used in the cell reselection like the present example, the cell selection criteria can be also called the cell reselection criteria.

For example, when the cell reselection is triggered such as received quality of the serving cell is degraded by a predetermined value or more, the radio terminal (UE) 2 performs the cell search operation as n=0 and i=1 by using a predetermined method (Step 11). At this time, the radio terminal (UE) 2 may search the cell from the strongest cell (also called the best cell) of the same frequency band as that of the serving cell, search the cell from the strongest cell of a frequency band of high priority, or search the cell by using any method other than the above methods.

The radio terminal (UE) 2 performs a received power measurement (or a received quality measurement) of the detected cell (Step 12). Further, the radio terminal (UE) 2 adjusts a value of the measured received power (or received quality) based on the cell selection criteria (for example, the decision threshold or the offset value) according to the type of the detected cell (or the carrier (of the downlink)) (Step 13).

The radio terminal (UE) 2 determines whether the detected cell satisfies the cell reselection criteria (Step 14). If the detected cell satisfies the cell reselection criteria, the radio terminal (UE) 2 stores information about the detected cell in the reselection cell list (Step 15). Further, the radio terminal (UE) 2 increases n by one (Step 16), detects the cell, and performs the same processing for the other detected cells as well.

Subsequently, if the cell is not detected (No at Step 11), the radio terminal (UE) 2 determines whether the candidate cells of the reselection cell list are present or absent (Step 17). For the cells of the reselection cell list, the radio terminal (UE) 2 performs ranking in consideration of the priority according to the type of the cell (or the carrier) (Step 18).

The radio terminal 2 determines whether a cell is suitable for the cell reselection target in the order from i=1 of the reselection cell list, namely, the highest ranked cell (Step 19). If the highest ranked cell is suitable for the cell reselection target, the cell is selected (Step 20). On the other hand, if the cell is not suitable for the cell reselection target, i is increased by one (Step 21). Further, the radio terminal (UE) 2 determines whether the second highest ranked cell is suitable for the cell reselection target (Step 19). If the processing is sequentially performed up to i>n and a suitable cell is not present (Step 22, Yes), the cell selection procedure is ended.

Second Embodiment

A second embodiment will be described.

Figure 5:
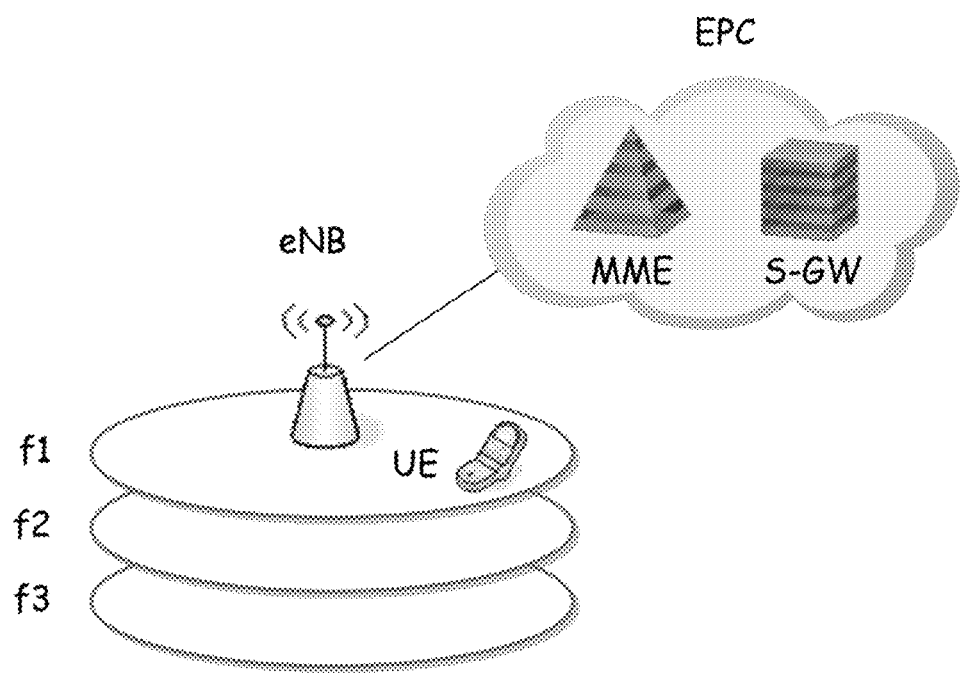
FIG. 5 is a system diagram illustrating an LTE according to a second embodiment of the present invention.

Hereinafter, in the case that a second radio communication system illustrated in FIG. 5 is supposed, the second embodiment of the present invention will be described.

FIG. 5 illustrates a configuration example of a radio communication system of 3GPP LTE (Long Term Evolution) being one preferred embodiment by applying the invention. The radio communication system is configured by a radio base station (enhanced Node B: eNB), a cell (Cell) managed by each radio base station (eNB), a radio terminal (User Equipment: UE) that camps on any one of the cells (Cells), and a core network (Evolved Packet Core: EPC) that manages the radio base station (eNB). Further, the core network (EPC) is configured by a mobility management apparatus (Mobility Management Entity: MME) and a serving gateway (Serving Gateway) for the radio terminal (UE).

In the embodiment of the present invention, the radio base station (eNB) has a function to control different types of cells, namely, a function to perform communication with the radio terminals (UEs) in different types of cells respectively. Suppose further that at least a part of the radio terminal (UE) has a function to perform communication in a plurality of different types of cells. As described above, it can be said that the radio base station (eNB) or radio terminal (UE) has a function to perform communication with the radio terminal (UE) or radio base station (eNB) by using different types of component carriers (Component Carriers: CCs). Suppose further that the radio terminal (UE) has a function to recognize the type of the cell, namely, to know the type of the cell or to be aware of the type of the cell. Further, it can be said that the radio terminal (UE) has a function to know a type of a DL CC and/or a UL CC, or to be aware of the type of the DL CC and/or the UL CC. In the present invention, the radio terminal (UE) performs a cell selection or cell reselection based on the cell selection criteria according to the type of the cell (or the component carrier). As the cell selection criteria, for example, the following matters are considered.

A decision threshold related to the cell selection or the cell reselection

An offset value related to the cell selection or the cell reselection

A priority related to the cell selection or the cell reselection

A combination of the above

Examples of the decision threshold include a minimum received power level (Qrxlevmin) and/or a minimum received quality level (Qqualmin) required to select (reselect) the cell, a received power level threshold (Thresh_serving, P) and/or a received quality level threshold (Thresh_serving, Q) for the serving cell at the time of reselecting the cell, a received power level threshold (Thresh_x, P) and/or a received quality level threshold (Thresh_x, Q) for other cell (cell x) (also called a neighbouring cell), and/or a period (Treselection) during which a target cell satisfies predetermined quality at the time of reselecting the cell.

Further, examples of the offset value include an offset value (Qrxlevminoffset) of the minimum received power level or an offset value (Qqualminoffset) of the minimum received quality level to be considered at the time of selecting the cell, and an offset value (Qoffset or Qhyst) used in a comparison of the received power level between the serving cell and other cell (also called a neighbouring cell) to be considered at the time of reselecting the cell.

Further, examples of the priority include the priority (cellSelectionPriority) to be considered at the time of selecting the cell and the priority (cellReselectionPriority) to be considered at the time of reselecting the cell. Further, in the present invention, the above-described decision threshold, offset value, and priority are configured in accordance with the type of the cell (or the component carrier).

Further, the cell selection criteria according to the type of the cell (or the component carrier) may be broadcast by using the system information (System Information Block: SIB) from the radio base station (eNB) to the radio terminals (UEs), may be informed by using individual signals (Dedicated Signaling) from the radio base station (eNB) to the radio terminals (UEs), or may be preconfigured to the radio terminals (UEs).

Further, cell support information (or carrier support information) about which type of the cell (or which type of the component carrier) the radio terminal (UE) is capable of using may be included in functional information (for example, Radio Access Capability and/or Radio Frequency Capability) of a radio unit of the radio terminal (UE) or other functional information (for example, NAS Capability and/or UE Capability) inherent to the radio terminal (UE). When the cell support information (or the carrier support information) is included in the functional information of the radio unit, that information is informed from the radio terminal (UE) to the radio base station (eNB). On the other hand, when the cell support information (or the carrier support information) is included in the other functional information inherent to the radio terminal (UE), that information is informed from the mobility management apparatus (MME) of the core network (EPC) to the radio base station (eNB). The cell support information is not limited thereto.

Here, as the type of the cell, for example, the following matters are considered.

A cell to which a conventional (legacy) radio terminal (UE) is accessible

A cell to which only a radio terminal (UE) having a specific capability (or function) is accessible A cell to which a conventional (legacy) radio terminal (UE) is accessible only for specific usage Here, the conventional (legacy) radio terminal (UE) is a radio terminal (UE) that has no function to perform a cell selection (namely, a cell selection (cell selection) or a cell reselection (cell reselection)), for example, based on the cell selection criteria (cell selection criteria) according to the type of the cell (or the carrier). On the other hand, the specific capability (or function) is, for example, a capability (or a function) to perform a cell selection (namely, a cell selection or a cell reselection) based on the cell selection criteria according to the type of the cell (or the carrier). Further, as the specific usage, it is considered, for example, that the cell is used as a secondary cell (Secondary Cell: SCell) (namely, a secondary component carrier (Secondary CC: SCC)) of a carrier aggregation (Carrier Aggregation: CA) that performs communication while using the cell (namely, the component carrier (CC)) of a plurality of LTEs at the same time.

As described above, "the cell selection criteria based on a type of the cell" can be said as (can be replaced by) "the cell selection criteria according to the type of the component carrier". Here, the types of the component carriers are classified based on predetermined characteristics related to a transmission configuration of signals transmitted by the component carriers. As the predetermined characteristics, for example, the following matters are considered.

A configuration of physical channels (Physical channel)

A transmission configuration of the reference signals (Reference Signal: RS) transmitted by the radio base station (eNB)

A transmission configuration of the control signals (Control Signal) transmitted by the radio station A transmission configuration of the system information (System Information: SI) transmitted by the radio station A type of the system information (System Information: SI) transmitted by the radio base station (eNB)

A radio transmission scheme (Radio Access Scheme)

A duplex operation (Duplex mode)

As a configuration of the physical channels (Physical channel), an allocation method of radio resources, for example, used for mapping of physical channels (Physical Channel Mapping), namely, transmission of each physical channel is considered. Examples of the transmission configuration of the reference signal (RS), which is a known signal, include a transmission period, a transmission band, a transmission density, a signal power density, a signal arrangement, a signal sequence, the number of transmission antennas of reference signals inherent to the cell (CRS), and types of the transmitted reference signals (RS). Examples of the types of the system information (System Information: SI) include a kind of the system information transmitted regardless of the types of the cells (or the component carriers) and a kind of the system information transmitted only in a specific type of the cell (or the component carrier).

As described above, the radio terminal (UE) in the idle state recognizes the type of the cell (or the component carrier) and performs the cell selection or cell reselection based on the cell selection criteria according to the type of the cell (or the component carrier). As a result, the radio terminals (UEs) in the idle state (RRC_Idle) can be appropriately distributed.

Figure 6:
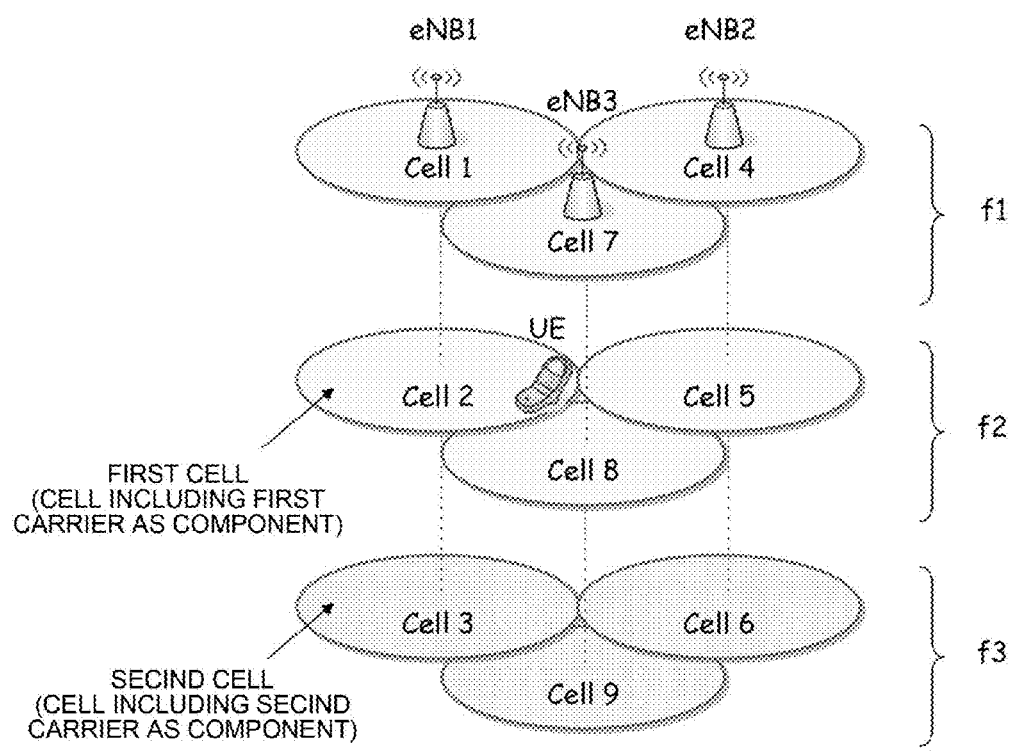
FIG. 6 is a system diagram illustrating a cell selection and a cell reselection by the radio terminal according to the second embodiment of the present invention.

Suppose, for example, that as illustrated in FIG. 6, each of the radio base stations (eNB) 1 to 3 operates cells (cells 1 to 3, cells 4 to 6, and cells 7 to 9) of frequencies f1 to f3. Further, in an example of FIG. 6, first cells (cell 1, cell 2, cell 4, cell 5, cell 7 and cell 8) formed by types of component carriers (first carriers) that can be used by all the radio terminals (UEs) in the LTE system and second cells (cell 3, cell 6, and cell 9) formed by the types of the component carriers (second carriers) that can be used only by a part of the radio terminal (UE) (namely, at least one of the downlink component carrier and the uplink component carrier is the second carrier) are mixed. At this time, the first radio terminal (UE) that is capable of camping only on the first cell among the radio terminals (UEs) that camp on an area (namely, a coverage) of the cell of the radio base station (eNB) 1 selects either of the cell 1 and the cell 2, and the second radio terminal (UE) that is capable of camping also on the second cell selects any one of the cells 1 to 3. Accordingly, there may arise a problem that in the case that the number of the first radio terminals (UEs) is dominant, for example, when the cell selection or cell reselection like conventional one without considering the type of the cells (or component carriers) is performed, the radio terminals (UEs) in the idle state (RRC_Idle) are concentrated in the first cells (cells 1 and 2).

However, in the present invention, for example, in order that the second radio terminal (UE) may preferentially select the cell (cell 3) formed by the second carrier, the decision threshold of cell selection to the cell (cell 3), the offset value, and/or the priority are indicated so that the cell tends to be selected. Thereby, the radio terminals (UEs) can be reasonably distributed into the cells (cells 1 and 2) formed by the first carrier and the cell (cell 3) formed by the second carrier. As a result, when the radio terminal (UE) in the idle state becomes active (RRC_Connected), concentration of a radio connection setup procedure (RRC Connection Setup Procedure) including a radio connection request (RRC Connection Setup Request) and concentration of subsequent traffic can be prevented.

The component carrier in the LTE indicates respective basic frequency components of the downlink and the uplink forming the cell as a base in which the radio base station (eNB) and the radio terminal (UE) perform communication. Subsequently, unless otherwise noted, the component carrier is simply described as a carrier.

Third Example

A radio communication system of 3GPP LTE is supposed and the third example of the present invention will be described.

First, a cell selection method and a cell reselection method of the radio terminal (UE) in an idle state (RRC_Idle) of the LTE will be described. In first cell selection (Initial Cell Selection) of the radio terminal in the idle state (RRC_Idle UE), the radio terminal (UE) searches (scans) all frequencies of frequency bands of E-UTRA supported by itself in accordance with a capability of a radio frequency unit in series. The E-UTRA is an appellation related to a radio interface part of the LTE system. The radio terminal (UE) may search a strongest cell (for example, a cell in which a detection level of CRS is highest, received power of CRS (RSRP) is largest, or received quality of CRS (RSRQ) is highest) in each frequency. On the other hand, when the radio terminal (UE) stores information about frequencies indicated by measurement control information previously received and information about cell parameters, the cell selection may be performed by using the above information (Stored Information Cell Selection). In this case, the entire frequency band of the E-UTRA supported by itself may need not be searched. When a suitable cell is found out, the radio terminal (UE) selects the cell and camps on the cell. Here, the suitable cell indicates a cell that satisfies predetermined cell selection criteria and on which camping (and an access to the radio base station (eNB)) of the radio terminal (UE) is permitted. As the predetermined cell selection criteria, the following formula (1) is specified (Non-patent literature 1).

$$S\text{rxlev}>0 \text{ AND } S\text{qual}>0 \quad (1)$$

Here, Srxlev and Squal are a received power level and a received quality level of reference signals (RS), and are calculated by using formulae (2) and (3), respectively.

$$S\text{rxlev}=Q\text{rxlevmeas}-(Q\text{rxlevmin}+Q\text{rxlevminoffset})-P\text{compensation} \quad (2)$$

$$S\text{qual}=Q\text{qualmeas}-(Q\text{qualmin}+Q\text{qualminoffset}) \quad (3)$$

Here, Qrxlevmeas is received power (Reference Signal Received Power: RSRP) of RS measured by the radio terminal (UE), Qrxlevmin is minimum requested received power, Qrxlevminoffset is an offset value for Qrxlevmin, and Pcompensation is a compensation value related to uplink transmission power capability of the radio terminal (UE). Similarly, Qqualmeas is received quality (Reference Signal Received Quality: RSRQ) of RS measured by the radio terminal (UE), Squalmin is minimum required received quality, and Squalminoffset is an offset value for Squalmin. In addition, Qrxlevminoffset and Qqualminoffset are applied only to measurement results of PLMN having high priority when the radio terminal (UE) camps on a VPLMN (Visitor Public Land Mobile Network). Further, it depends on the implementation of the radio terminal (UE) from which frequency band the radio terminal (UE) starts searching. Further, information about frequency bands of the cell on which the radio terminal (UE) previously has camped may be stored and the search may be started from the frequency band.

Next, a cell reselection method of the radio terminal (UE) in the idle state (RRC_Idle) of the LTE will be described. First, in order that the radio terminal (UE) may prevent an unnecessary measurement, in the case that the received power or received quality of the cell (serving cell) on which the radio terminal (UE) is camping is better than a predetermined threshold (S_IntraSearchP or S_IntraSearchQ) like formula (4) as described below, the cell reselection to the cell of the same frequency may need not be performed.

$$S\text{rxlev}>S\_\text{IntraSearch}P \text{ And } S\text{qual}>S\_\text{IntraSearch}Q \tag{4}$$

In the case that formula (4) is not satisfied, the radio terminal (UE) performs measurement (Intra-frequency measurement) of other cells of the same frequency. Further, for the cell that satisfies formula (1), the radio terminal (UE) performs ranking based on formulae (5) and (6) as described below.

$$Rs = Q\text{meas},s + Q\text{hyst} \tag{5}$$

$$Rn = Q\text{meas},n - Q\text{offset} \tag{6}$$

Here, Qmeas,s and Qmeas,n are an average of RSRP of the serving cell and an average of RSRP of each neighbouring cell, respectively. Further, Qhyst and Qoffset are an offset value for RSRP of the serving cell and an offset value for RSRP of each neighbouring cell, respectively. Further, for the cell ranked as the best cell (best cell), a cell that satisfies predetermined first cell reselection criteria is selected. The first cell reselection criteria are specified as follows. That is, one or more seconds have elapsed since the radio terminal (UE) camped on the current serving cell, and the target cell (a candidate of a new serving cell) is ranked higher than the serving cell during Treselection_EUTRA. When the cell that satisfies the above criteria is not present, or when the serving cell is ranked as the best cell, the cell reselection is not performed.

On the other hand, control of the cell reselection to the cell of frequency different from that of the serving cell or control of the cell reselection to the cell of a different radio access technology (Radio Access Technology: RAT) is performed in accordance with any one of the following items.

1) The cell reselection to a neighbouring cell of other RAT or the LTE having high priority:

In the case that there is frequency assigned higher cell reselection priority than that of the frequency of serving cell, measurement of the LTE cell of the frequency (Inter-frequency measurement) or measurement of other RAT cell of the frequency (Inter-RAT measurement) is performed, and a cell that satisfies the predetermined second cell reselection criteria is selected.

2) The cell reselection to neighbouring cells of the LTE having the same priority:

In order that the radio terminal (UE) may prevent an unnecessary measurement, in the case that formula (7) as described below is satisfied, the measurement (Inter-frequency measurement) of the LTE cell of the frequency in which assigned is the same cell reselection priority as that of the frequency of the serving cell may not be performed. On the other hand, in the case that formula (7) as described below is not satisfied, the measurement (Inter-frequency measurement) of the LTE cell of the frequency in which the same cell reselection priority as that of the frequency of the serving cell is performed, and a cell that satisfies the predetermined third cell reselection criteria is selected.

$$S\text{rxlev}>S\_\text{nonIntraSearch}P \text{ And}$$
$$S\text{qual}>S\_\text{nonIntraSearch}Q \tag{7}$$

3) The cell reselection to a neighbouring cell of other RAT or the LTE having low priority:

In the case that formula (7) as described above is not satisfied, a measurement of the LTE cell (Inter-frequency measurement) of frequency in which lower cell reselection priority than that of the frequency of the serving cell is assigned, or a measurement of the cell of other RAT (Inter-RAT measurement) of frequency in which lower cell reselection priority than that of the frequency of the serving cell is performed, and the cell that satisfies the predetermined fourth cell reselection criteria is selected.

Further, the cell reselection priority is broadcast as the system information (System Information), or is informed by using the radio terminal (UE) individual signals (Dedicated Signaling).

Here, the second cell reselection criteria are specified as follows. That is, one or more seconds have elapsed since the radio terminal (UE) camped on the current serving cell, and formula (8) or (9) as described below is satisfied during Treselection_RAT (for example, Treselection_EUTRA, Treselection_UTRA, Treselection_GERA, Treselection_CDMA_1×RTT, and Treselection_CDMA_HRPD).

$$S\text{qual}>\text{Thresh}\_X, \text{High}Q \tag{8}$$

$$S\text{rxlev}>\text{Thresh}\_X, \text{High}P \tag{9}$$

Thresh_X and HighQ, or Thresh_X and HighP is a threshold for received quality or that for received power in the cell of frequency having high priority of the cell reselection, respectively.

Suppose, for example, that information ("threshServingLowQ") corresponding to "Thresh_Serving, LowQ" is broadcast by using the system information (SystemInformationBlockType3: SIB3). In this case, formula (8) is applied to a cell of other frequencies of E-UTRAN or a cell of frequency of UTRAN FDD (Frequency Division Duplex). Further, formula (9) is applied to a cell (for example, UTRAN TDD (Time Division Duplex), GERAN (GSM/EDGE Radio Access Network), CDMA2000 1×RTT, and HRPD) of other frequencies. In the case that "threshServingLowQ" is not broadcast, formula (9) is applied to cells of all of the relevant frequencies.

Further, the third cell reselection criteria are basically similar to the above-described first cell reselection criteria. The third cell reselection criteria differ from the first cell reselection criteria in that candidate cells of the cell reselection are cells of the LTE of different frequencies.

Further, the fourth cell reselection criteria are specified as follows. That is, one or more seconds have elapsed since the radio terminal (UE) camped on the current serving cell, and any one of formulae (10) to (12) as described below is satisfied in the Treselection_RAT (for example, Treselection_EUTRA, Treselection_UTRA, Treselection_GERA, Treselection_CDMA_1×RTT, and Treselection_CDMA_HRPD).

$$S\text{qual\_Serving}<\text{Thresh\_Serving}, \text{Low}Q \text{ And}$$
$$S\text{qual\_Neigh}>\text{Thresh}\_X, \text{Low}Q \tag{10}$$

$$S\text{qual\_Serving}<\text{Thresh\_Serving}, \text{Low}Q \text{ And}$$
$$S\text{rxlev\_Neigh}>\text{Thresh}\_X, \text{Low}P \tag{11}$$

$$S\text{rxlev\_Serving}<\text{Thresh\_Serving}, \text{Low}P \text{ And}$$
$$S\text{rxlev\_Neigh}>\text{Thresh}X, \text{Low}P \tag{12}$$

For example, in the case that "threshServingLowQ" is broadcast by using the system information (SIB3), formula (10) is applied to the cell of other frequencies of E-UTRAN or the cell of frequency of UTRAN FDD, and formula (11) is applied to the cell of other frequencies (for example, UTRAN TDD, GERAN, CDMA2000 1×RTT, and HRPD). In the case that "threshServingLowQ" is not broadcast, formula (12) is applied to the cells of all of the relevant frequencies.

In the present invention, in the above-described cell selection by the radio terminals (UEs) in the idle state (RRC_Idle) of LTE, parameters such as Qrxlevmin, Qrxlevminoffset, Pcompensation, Qqualmin, and Qqualminoffset being the cell selection criteria used for the cell selection by the radio terminals (UEs) are further configured to each type of the cell (or the carrier). For example, the parameters being the cell selection criteria for the first cell having as a component a kind of carrier (first carrier) that can be used by all the radio terminals (UEs) in the LTE system may be defined as Qrxlevmin, Qrxlevminoffset, Pcompensation, Qqualmin, and Qqualminoffset. Further, the parameters being the cell selection criteria for the second cell having as a component a kind of carrier (second carrier) that a part of radio terminals (UEs) in the LTE system is capable of using may be defined as Qrxlevmin_2, Qrxlevminoffset_2, Pcompensation_2, Qqualmin_2, and Qqualminoffset_2.

Further, in the present invention, the priority considered during the cell selection may be configured to each type of the cell (or the carrier) in place of the above-described parameters or in addition to the above-described parameters. For the priority, the priority (Cell Selection Priority) of the cell selection for each type of the cell (or the carrier) may be configured by using an absolute value (namely, an absolute level). Further, the priority (Cell Selection Priority) of the cell selection for each type of the cell (or the carrier) may be configured by using a relative priority (namely, a relative level) of other type of the cell (or the carrier) for a specific type of the cell (or the carrier).

For example, the priority of the cell selection for each of the first cell (or carrier) and the second cell (or carrier) may be defined as A_CSP1 and A_CSP2 by using an absolute value (for example, as a value is smaller, the priority becomes higher). Further, the priority of the cell selection of the second cell (or carrier) for the first cell (or carrier) may be defined as R_CSP2 by using a relative value (for example, when a value is smaller than one, the priority is high, whereas when a value is larger than one, the priority is low). A method for configuring an absolute value or a relative value is not limited thereto.

As an example of configuring the parameters or the priority, the example of the above-described LTE system illustrated in FIG. 6 is used. When the number of the first radio terminals (UEs) is dominant, the radio terminals (UEs) in the idle state (RRC_Idle) are concentrated in the first cell (for example, the cells 1 and 2) formed by the first carrier by using a conventional method. However, the above-described parameters are configured (for example, values of Qrxlevmin_2, Qrxlevminoffset_2, Pcompensation_2, Qqualmin_2, and Qqualminoffset_2 are configured to be smaller than those of corresponding Qrxlevmin, Qrxlevminoffset, Pcompensation, Qqualmin, and Qqualminoffset) or the priority is made high (for example, a value of A_CSP2 is configured to be smaller than a value of A_CSP1) so that the present invention is applied and the second cell (for example, the cell 3) formed by the second carrier is selected preferentially. As a result, the second radio terminals (UEs) are suitably concentrated in the second cell (for example, the cell 3) formed by the second carrier and the cells on which the radio terminals (UEs) in the idle state (RRC_Idle) camp can be appropriately distributed.

Suppose, on the other hand, that the number of the second radio terminals (UEs) is dominant and the second cell formed by the second carrier is increased like FIGS. 6 and 7. Also in this case, in the conventional method, the first cell formed by the first carrier that can be selected by the first radio terminal (UE) is one (for example, the cell 1) per the radio base station (eNB) and the second radio terminal (UE) is capable of selecting all the cells, and therefore the radio terminals (UEs) in the idle state (RRC_Idle) are concentrated in the first cell (for example, the cell 1). However, the above-described parameters are configured so that the present invention is applied and the second cell (for example, the cell 3) formed by the second carrier is selected preferentially. As a result, the second radio terminals (UEs) are concentrated in the second cell (for example, the cells 2 and 3), and the second radio terminals (UEs) are appropriately distributed between the second cells. Further, the cells on which the radio terminals (UEs) in the idle state (RRC_Idle) camp can be appropriately distributed. In addition, it goes without saying that the present invention can be similarly applied to three or more types of the cells (or the carriers).

In a similar fashion, in the present invention, in the above-described cell reselection by the radio terminals (UEs) in the idle state (RRC_Idle) of the LTE, the parameters such as Thresh_X, HighQ, Thresh_X, HighP, Thresh_Serving, LowQ, Thresh_Serving, LowP, and Treselection_EUTRA being the cell selection criteria used in the cell reselection by the radio terminal (UE) are further configured to each type of the carrier (or the cell). For example, the parameters being the cell selection criteria for the first carrier may be defined as Thresh_X, HighQ, Thresh_X, HighP, Thresh_Serving, LowQ, Thresh_Serving, LowP, Treselection_EUTRA, Qoffset, and Qhyst. Further, the parameters being the cell selection criteria for the second carrier may be defined as Thresh_X, HighQ_2, Thresh_X, HighP_2, Thresh_Serving, LowQ_2, Thresh_Serving, LowP_2, Treselection_EUTRA_2, Qoffset_2, and Qhyst_2.

Further, in the present invention, the priority to be considered during the cell reselection may be configured to each type of the cell (or the carrier) in place of the above-described parameters or in addition to the above-described parameters. In the priority, the priority (Cell Selection Priority) of the cell selection for each type of the cell (or the carrier) may be configured by using an absolute value (namely, an absolute level). Further, the priority (Cell Selection Priority) of the cell selection for each type of the cell (or the carrier) may be configured by using a relative priority (namely, a relative level) of another type of the cell (or the carrier) for a specific type of the cell (or the carrier).

For example, the priority of the cell reselection for each of the first cell (or the first carrier) and the second cell (or the second carrier) may be defined as A_CRSP 1 and A_CRSP 2 by using an absolute value (for example, as a value is smaller, the priority becomes higher). Further, the priority of the cell reselection of the second cell (or the second carrier) compared with the first cell (or the carrier) may be defined as R_CRSP2 by using a relative value (for example, when a value is smaller than one, the priority is high, whereas when a value is larger than one, the priority is low). A method for configuring an absolute value or a relative value is not limited thereto. In addition, the priority in the present invention is different from the priority (Cell Reselection Priority) of the cell reselection conventionally configured for each frequency and is the priority of the cell reselection configured for each type of the cell (or the carrier).

Here, values of the above-described parameters or the priority may be broadcast as the system information (SIB) like FIG. 8 or 9. Further, the values of the above-described parameters or the priority may be informed by using individual signals (Dedicated Signaling) such as an RRC connection reconfiguration message (RRC Connection Reconfiguration message), an RRC connection rejection message (RRC Connection Reject message), an RRC connection reestablishment rejection message (RRC Connection Reestablishment Reject message), and an RRC connection release message (an RRC Connection Release message) to each radio terminal (UE). Alternatively, the values of the above-described parameters or the priority may be preconfigured to the radio terminal (UE).

In accordance with the control as described above, the radio terminal (UE) in the idle state (RRC_Idle) is capable of performing the cell selection and the cell reselection in consideration of the type of the cell (or the carrier) and the cells on which the radio terminals (UEs) in the idle state (RRC_Idle) are camping can be appropriately distributed. Further, as a result, processing of the connection establishment procedure (RRC Connection Setup Procedure) including the connection request (RRC Connection Request) for changing the radio terminal (UE) into the active state (RRC_Connected) from the idle state (RRC_Idle) can be prevented from being concentrated in the specific cell.

As a method for recognizing the type of the cell (or the type of the carrier) by the radio terminal (UE), the following methods are considered. For example, there is considered a method in which the type of the cell (or the type of the downlink carrier and the type of the uplink carrier) is indicated by using the system information (System Information Block: SIB) transmitted from the radio base station (eNB) and the radio terminal (UE) demodulates the system information to thereby recognize the type of the cell (or the type of the carrier). As other methods, for example, the radio terminal (UE) recognizes (may also be considered as detection) the type of the cell (or the type of the downlink carrier as a component of the cell) depending on whether a reference signal (RS, for example, CRS) or a synchronization signal (SS) transmitted in a conventional (legacy) LTE carrier (for example, the first carrier) is transmitted, whether the transmission configuration of the reference signal (RS) or the synchronization signal (SS) is the same as that of the reference signal (RS) or the synchronization signal (SS) transmitted in a conventional LTE carrier, whether the reference signal (RS) or the synchronization signal (SS) is transmitted with the transmission configuration specified for a predetermined type of the cell (or the downlink carrier (for example, the second carrier)), or whether the reference signal (RS) or synchronization signal (SS) specified for a predetermined type of the cell (or the downlink carrier) is transmitted.

On the other hand, as a procedure through which the radio terminal (UE) detects the cell, for example, the following matters are considered.

Detection of the conventional LTE cell (namely, the conventional downlink carrier) is tried for each frequency being a candidate, and then detection of a specific type of the LTE cell (namely, a specific type of the downlink carrier) is tried.

When detection of the conventional LTE cell is tried for each frequency being a candidate and an appropriate cell (suitable cell or acceptable cell) cannot be detected, detection of a specific type of the LTE cell is tried for the relevant frequency.

When detection of a specific type of the LTE cell is tried for each frequency being a candidate and an appropriate cell (suitable cell or acceptable cell) cannot be detected, detection of the conventional LTE cell is tried for the relevant frequency.

Detection of the conventional LTE cell and a specific type of the cell is tried at the same time for each frequency being a candidate.

However, the above-described procedure is not limited thereto. Further, the procedure may be performed from a frequency with high priority in descending order, or the procedure may be performed from a lower (or higher) frequency in order. Further, any cell except the conventional LTE cell may be basically specified as a specific type of the cell. Further, the specific type of the cell may be previously indicated from the radio base station (eNB), or may be preconfigured to the radio terminal (UE). Alternatively, the radio terminal (UE) may recognize (namely, recognize which type of the cell should be detected) the specific type of the cell based on cell support information (or carrier support information) of the radio terminal (UE) itself.

Fourth Example

Operations of the cell selection (Cell Selection) of the radio terminal (UE) of the present invention will be specifically described with reference to FIG. 10.

Figure 10:
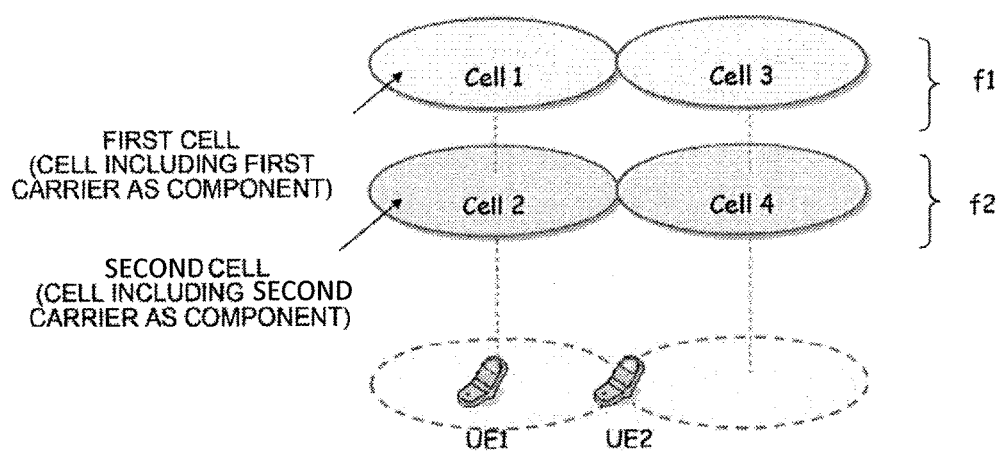
FIG. 10 is a system diagram illustrating the cell selection by the radio terminal according to a fourth example of the present invention.

In FIG. 10, the radio terminal (UE) 1 and the radio terminal (UE) 2 are each supposed to perform a cell selection in spots of the figure. The Cell 1 and the Cell 3 belong to the first cell that is formed by the first carrier and on which also conventional radio terminals (UEs) are capable of camping, and the Cell 2 and the Cell 4 belong to the second cell that is formed by the second carrier and on which a part of the radio terminal (UE) is capable of camping. Further, as the cell selection criteria according to the type of the cell (or the carrier), Qrxlevmin and Qqualmin are supposed to be configured to the first cell (for example, the Cell 1 and the Cell 3), and Qrxlevmin_2 and Qqualmin_2 are supposed to be configured to the second cell (for example, the Cell 2 and the Cell 4). For simplicity, Qrxlevminoffset, Pcompensation, and Qqualminoffset of formulae (2) and (3) as described above are supposed to be zero (namely, not to be used).

First, operations of the cell selection of the radio terminal (UE) 1 will be described.

The radio terminal (UE) 1 performs a cell detection for each of frequency 1 (f1) and frequency 2 (f2) to detect the Cell 1 and the Cell 2. Further, the cell detection may be first tried for either of f1 and f2. The radio terminal (UE) 1 determines whether the Cell 1 and the Cell 2 each satisfy the cell selection criteria. In the present example, as a cell selection method of the radio terminal (UE) 1, five cases are considered below.

Case 1) The Cell 1 satisfies the cell selection criteria and the Cell 2 does not satisfy it. In this case, the radio terminal (UE) 1 selects the Cell 1.

Case 2) The Cell 1 does not satisfy the cell selection criteria but the Cell 2 satisfies it. In this case, the radio terminal (UE) 1 selects the Cell 2.

Case 3) The Cell 1 satisfies the cell selection criteria and the Cell 2 also satisfies it. Further, received quality of the Cell 1 is better than that of the Cell 2. In this case, the radio terminal (UE) 1 selects the Cell 1.

Case 4) The Cell 1 satisfies the cell selection criteria and the Cell 2 also satisfies it. Further, received quality of the Cell 2 is better than that of the Cell 1. In this case, the radio terminal (UE) 1 selects the Cell 2.

Case 5) The Cell 1 satisfies the cell selection criteria and the Cell 2 also satisfies it. On the other hand, the Cell 2 is higher in the priority than the Cell 1. In this case, the radio terminal (UE) 1 selects the Cell 2.

Next, operations of the cell selection of the radio terminal (UE) 2 will be described. The radio terminal (UE) 2 performs the cell detection for each of f1 and f2, and further detects the Cell 1 and the Cell 3 of f1 and detects the Cell 2 and the Cell 4 of f2. Further, the cell detection may be first tried for either of f1 and f2. Next, the radio terminal (UE) 2 takes notice of a cell having a best reception characteristic (for example, received quality is high) for each of f1 and f2.

Suppose, for example, that the Cell 1 has the best characteristic of f1 and the Cell 4 has the best characteristic of f2. At this time, in the same manner as in the case of the radio terminal (UE) 1, five cases are considered below as the cell selection method of the radio terminal (UE) 2.

Case 1) The Cell 1 satisfies the cell selection criteria and the Cell 4 does not satisfy it. In this case, the radio terminal (UE) 1 selects the Cell 1.

Case 2) The Cell 1 does not satisfy the cell selection criteria but the Cell 4 satisfies it. In this case, the radio terminal (UE) 1 selects the Cell 4.

Case 3) The Cell 1 satisfies the cell selection criteria and the Cell 4 also satisfies it. Further, received quality of the Cell 1 is better than that of the Cell 4. In this case, the radio terminal (UE) 1 selects the Cell 1.

Case 4) The Cell 1 satisfies the cell selection criteria and the Cell 4 also satisfies it. Further, received quality of the Cell 4 is better than that of the Cell 1. In this case, the radio terminal (UE) 1 selects the Cell 4.

Case 5) The Cell 1 satisfies the cell selection criteria and the Cell 4 also satisfies it. On the other hand, the Cell 4 is higher in the priority than the Cell 1. In this case, the radio terminal (UE) 1 selects the Cell 4.

The cell selection (Cell Selection) is performed in consideration of the type of the above-described cell (or carrier), and thereby the cells on which the radio terminals (UEs) in the idle state (RRC_Idle) camp can be appropriately distributed.

Fifth Example

Figure 11:
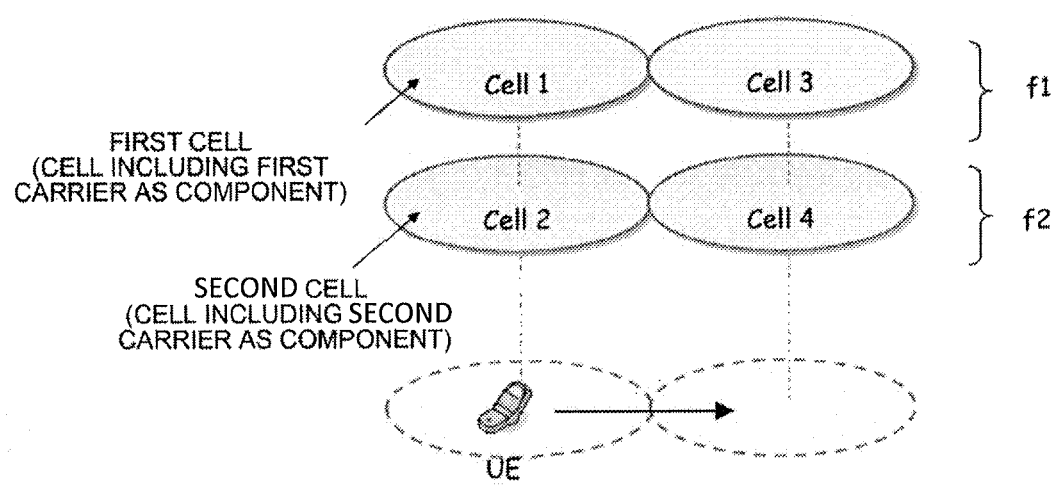
FIG. 11 is a system diagram illustrating the cell reselection by the radio terminal according to a fifth example of the present invention.
Figure 12:
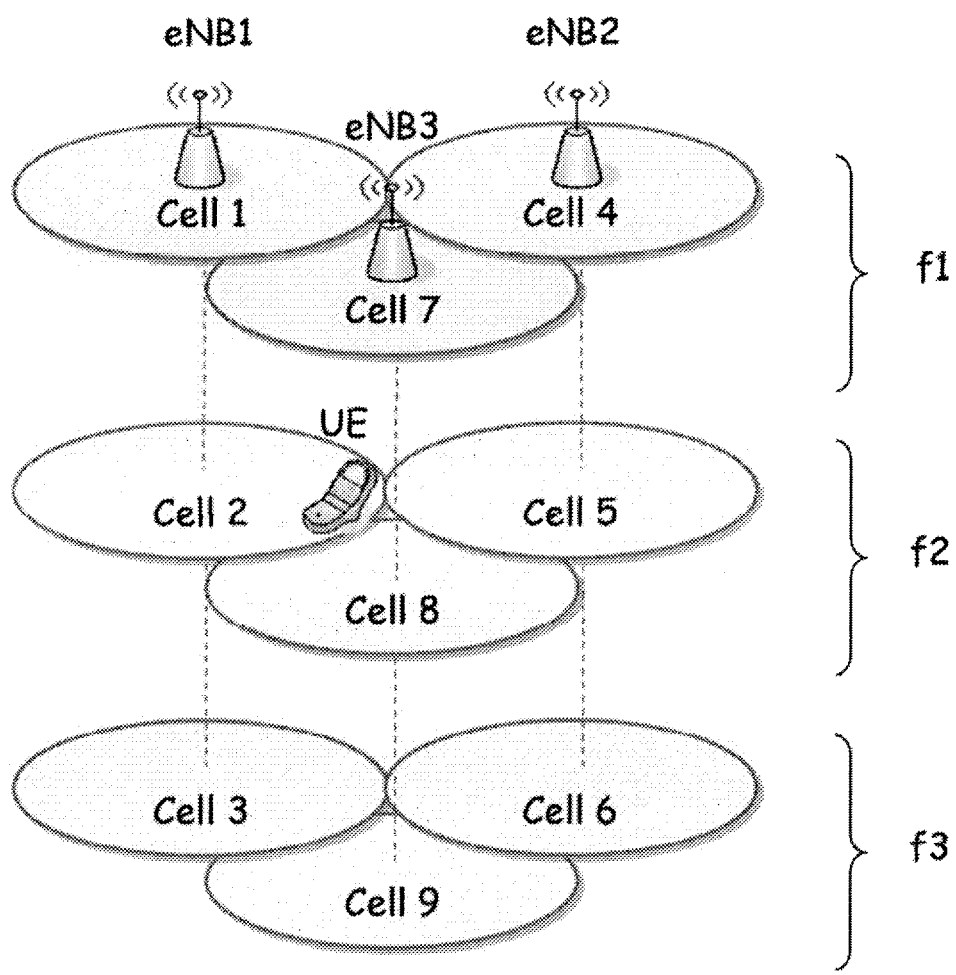
FIG. 12 is a system diagram illustrating a cell selection and a cell reselection by a conventional (legacy) radio terminal.

Operations of the cell reselection (Cell Reselection) of the radio terminal (UE) of the present invention will be specifically described with reference to FIG. 11. Suppose that in FIG. 11, the radio terminal (UE) moves like an arrow (→) in the figure and performs the cell reselection (Cell Reselection). The Cell 1 and the Cell 3 belong to the first cell that is formed by the first carrier and on which the conventional radio terminals (UEs) are also capable of camping, and the Cell 2 and the Cell 4 belong to the second cell that is formed by the second carrier and on which a part of the radio terminal (UE) is capable of camping. Further, as the cell reselection criteria according to the type of the cell (or the carrier), Qoffset, Qhyst, Thresh_X, HighQ, Thresh_X, HighP, Thresh_Serving, LowQ, Thresh_Serving, LowP, Thresh_X, LowQ, Thresh_X, and LowP are supposed to be configured to the first cell (for example, the Cell 1 and the Cell 3), and Qoffset_2, Qhyst_2, Thresh_X, HighQ_2, Thresh_X, HighP_2, Thresh_Serving, LowQ_2, Thresh_Serving, LowP_2, Thresh_X, LowQ_2, Thresh_X, and LowP_2 are supposed to be configured to the second cell (for example, the Cell 2 and the Cell 4). For simplicity, the same cell selection criteria are supposed to be used as the cell selection criteria in the first cell and the second cell.

Suppose first that the radio terminal (UE) camps on the Cell 1 and the priority of the cell reselection (Cell Reselection Priority) in each frequency is the same in f1 and f2. At this time, the radio terminal (UE) performs the cell reselection based on the following procedure. The radio terminal (UE) determines whether received quality (for example, RSRP and RSRQ) of the serving cell (namely, the Cell 1) is higher than a predetermined received quality (for example, S_nonIntraSearchP and S_nonIntraSearchQ). In the case that the received quality of the serving cell is higher than the predetermined received quality, the cell reselection procedure is ended. In the case that the received quality of the serving cell is lower than the predetermined received quality, the radio terminal (UE) performs the received quality measurement of peripheral cells. In the present example, the Cell 2, the Cell 3, and the Cell 4 are supposed to be detected. The radio terminal (UE) determines whether each cell satisfies predetermined cell reselection criteria (for example, Squal_Serving<Thresh_Serving, LowQ And Squal_Neigh>Thresh_X, LowQ). Further, the radio terminal (UE) selects the cell that satisfies the cell reselection criteria and the reception characteristic of which is best (for example, the received quality is high). For example, when the Cell 3 and the Cell 4 satisfy the cell reselection criteria, the radio terminal (UE) camps on the cell the received quality of which is higher, as the serving cell.

On the other hand, the priority may be configured between the first cell formed by the first carrier and the second cell formed by the second carrier. For example, when the priority is configured so that the second cell is selected more preferentially than the first cell, the radio terminal (UE) selects the Cell 4 as the serving cell and camps on the Cell 4.

The cell reselection (Cell Reselection) is performed in consideration of the type of the cell (or carrier) as described above, and thereby the cells on which the radio terminals (UEs) in the idle state (RRC_Idle) camp can be appropriately distributed.

Sixth Example

A specific example of policies of the cell selection and the cell reselection according to the present invention will be described. In the present invention, for example, four policies of the cell selection and the cell reselection are considered below.

A) The best cell is selected most preferentially.

B) While the cell in frequency of high priority is most prioritized, the best cell is selected among frequencies of the same priority.

C) While the cell in frequency of high priority is most prioritized, a predetermined type of the cell is selected preferentially (or the cell having as a component a predetermined type of the carrier) among frequencies of the same priority.

D) A predetermined type of the cell is selected most preferentially (or the cell having as a component the predetermined type of the carrier).

In accordance with purposes and situations, the above policies are configured in common to or separately with the radio terminal (UE), and thereby the cells on which the radio terminals (UEs) in the idle state (RRC_Idle) camp can be appropriately distributed.

In the embodiment of the above-described LTE, a Homogeneous Network in which only cells of a macro radio base station (Macro eNB) are present is supposed; however, an application scope of the present invention is not limited thereto. For example, it goes without saying that the embodiment is applicable also to a Heterogeneous Network (HetNet) in which a macro radio base station (Macro eNB), a pico radio base station (Pico eNB), and a femto radio base station (Femto eNB) are mixed.

Further, in the embodiment as described above, 3GPP LTE is supposed and described as the radio communication system; however, the target of the present invention is not limited thereto. Further, the present invention is applicable to GSM (Global System for Mobile communications), UMTS (Universal Mobile Telecommunications System), CDMA 2000 (Code Division Multiple Access 2000) and evolved versions thereof (1×RTT and HRPD), WiMAX (Worldwide interoperability for Microwave Access), and the like.

Further, the present invention is not necessarily limited to the above embodiments and examples, but can be variously verified and performed in a range of technical idea. Further, the above embodiments or examples may be arbitrarily performed in combination thereof.

As apparent from the above description, it is possible to constitute each unit by hardware. Alternatively, it is possible to achieve a function of each unit by a computer program. In this case, a processor operating on a program stored in a program memory realizes the functions and the operations as described in the above embodiments.

Further, the above embodiments may be partially or entirely described similarly to, but not limited to, the following supplementary notes.

(Supplementary note 1) A radio communication system in which a radio station and a radio terminal communicate with each other, including:

a control means with which at least one of the radio stations controls a plurality of types of cells by using one radio access technology;

a recognition means with which the radio terminal recognizes a type of a cell; and a cell selection means with which the radio terminal selects the cell based on a cell selection criteria according to the type of the cell.

(Supplementary note 2) The radio communication system described in the supplementary note 1, wherein a selection of the cell is a cell selection or a cell reselection in a state in which a radio connection between the radio terminal and the radio station is not established.

(Supplementary note 3) The radio communication system described in the supplementary note 1 or 2, wherein the type of the cell is identified by a type of a carrier being a component of the cell.

(Supplementary note 4) The radio communication system described in the supplementary note 3, wherein the type of the carrier is classified by a transmission configuration of a transmitted signal.

(Supplementary note 5) The radio communication system described in the supplementary note 3 or 4, wherein the type of the carrier is classified by a configuration of a physical channel.

(Supplementary note 6) The radio communication system described in any one of the supplementary notes 3 to 5, wherein the type of the carrier is classified by the transmission configuration of at least any one of a known signal, system information, and a control signal transmitted from the radio station in the carrier.

(Supplementary note 7) The radio communication system described in any one of the supplementary notes 3 to 6, wherein the type of the carrier is classified by contents of the system information.

(Supplementary note 8) The radio communication system described in any one of the supplementary notes 3 to 7, wherein the type of the carrier is classified by a radio transmission scheme.

(Supplementary note 9) The radio communication system described in any one of the supplementary notes 3 to 8, wherein the type of the carrier is classified by a duplex mode.

(Supplementary note 10) The radio communication system described in any one of the supplementary notes 1 to 9, wherein the cell selection criteria include a decision threshold related to a cell selection or a cell reselection, or an offset value related to a cell selection or a cell reselection.

(Supplementary note 11) The radio communication system described in any one of the supplementary notes 1 to 10, wherein the cell selection criteria include priority related to a cell selection or a cell reselection.

(Supplementary note 12) The radio communication system described in any one of the supplementary notes 1 to 11, wherein the radio station broadcasts or individually transmits the cell selection criteria to the radio terminal.

(Supplementary note 13) The radio communication system described in any one of the supplementary notes 1 to 12, wherein the control means has a function to control at least a first carrier and a second carrier; and the radio terminal is classified into a first radio terminal having a function to use only the first carrier and a second radio terminal having a function to use the first carrier and the second carrier.

(Supplementary note 14) The radio communication system described in the supplementary note 13, wherein in a frequency band supported by the second radio terminal, the second radio terminal preferentially selects a cell of the second carrier that satisfies the cell selection criteria.

(Supplementary note 15) A radio terminal for use in a radio communication system in which a radio station controls a plurality of types of cells by using one radio access technology, including:

a recognition means that recognizes a type of a cell; and a cell selection means that selects the cell based on a cell selection criteria according to the type of the cell.

(Supplementary note 16) The radio terminal described in the supplementary note 15, wherein a selection of the cell is a cell selection or a cell reselection in a state in which a radio connection between the radio terminal and the radio station is not established.

(Supplementary note 17) The radio terminal described in the supplementary note 15 or 16, wherein the type of the cell is identified by a type of a carrier being a component of the cell.

(Supplementary note 18) The radio terminal described in the supplementary note 17, wherein the type of the carrier is classified by a transmission configuration of a transmitted signal.

(Supplementary note 19) The radio terminal described in the supplementary note 17 or 18, wherein the type of the carrier is classified by a configuration of a physical channel.

(Supplementary note 20) The radio terminal described in any one of the supplementary notes 17 to 19, wherein the type of the carrier is classified by the transmission configuration of at least any one of a known signal, system information, and a control signal transmitted from the radio station in the carrier.

(Supplementary note 21) The radio terminal described in any one of the supplementary notes 17 to 20, wherein the type of the carrier is classified by contents of the system information.

(Supplementary note 22) The radio terminal described in any one of the supplementary notes 17 to 21, wherein the type of the carrier is classified by a radio transmission scheme.

(Supplementary note 23) The radio terminal described in any one of the supplementary notes 17 to 22, wherein
the type of the carrier is classified by a duplex mode.

(Supplementary note 24) The radio terminal described in any one of the supplementary notes 15 to 23, wherein
the cell selection criteria include a decision threshold related to a cell selection or a cell reselection, or an offset value related to a cell selection or a cell reselection.

(Supplementary note 25) The radio terminal described in any one of the supplementary notes 15 to 24, wherein
the cell selection criteria include priority related to a cell selection or a cell reselection.

(Supplementary note 26) The radio terminal described in any one of the supplementary notes 15 to 25, wherein
the cell selection criteria are received from the radio station.

(Supplementary note 27) The radio terminal described in any one of the supplementary notes 15 to 26, wherein
the radio terminal is classified into a radio terminal having a function to use only a first carrier and a radio terminal having a function to use the first carrier and a second carrier.

(Supplementary note 28) The radio terminal described in the supplementary note 27, wherein
a function to use the first carrier and the second carrier is equipped, wherein in a frequency band supported by the radio terminal, the cell selection means preferentially selects a cell of the second carrier that satisfies the cell selection criteria.

(Supplementary note 29) A radio station including:
a control means that controls a plurality of types of cells by using one radio access technology; and
a means that broadcasts or individually transmits cell selection criteria to be criteria when a radio terminal selects the cell, wherein
the cell selection criteria are configured in accordance with a type of a cell.

(Supplementary note 30) A cell selection method including:
causing at least one radio station to control a plurality of types of cells by using one radio access technology;
causing a radio terminal to recognize a type of a cell; and
causing the radio terminal to select the cell based on a cell selection criteria according to the type of the cell.

(Supplementary note 31) The cell selection method described in the supplementary note 30, wherein
a selection of the cell is a cell selection or a cell reselection in a state in which a radio connection between the radio terminal and the radio station is not established.

(Supplementary note 32) The cell selection method described in the supplementary note 30 or 31, wherein
the type of the cell is identified by a type of a carrier being a component of the cell.

(Supplementary note 33) The cell selection method described in the supplementary note 32, wherein
the type of the carrier is classified by a transmission configuration of a transmitted signal.

(Supplementary note 34) The cell selection method described in the supplementary note 32 or 33, wherein
the type of the carrier is classified by a configuration of a physical channel.

(Supplementary note 35) The cell selection method described in any one of the supplementary notes 32 to 34, wherein
the type of the carrier is classified by a transmission configuration of at least any one of a known signal, system information, and a control signal transmitted from the radio station in the carrier.

(Supplementary note 36) The cell selection method described in any one of the supplementary notes 32 to 35, wherein
the type of the carrier is classified by contents of the system information.

(Supplementary note 37) The cell selection method described in any one of the supplementary notes 32 to 36, wherein
the type of the carrier is classified by a radio transmission scheme.

(Supplementary note 38) The cell selection method described in any one of the supplementary notes 32 to 37, wherein
the type of the carrier is classified by a duplex mode.

(Supplementary note 39) The cell selection method described in any one of the supplementary notes 30 to 38, wherein
the cell selection criteria include a decision threshold related to a cell selection or a cell reselection, or an offset value related to a cell selection or a cell reselection.

(Supplementary note 40) The cell selection method described in any one of the supplementary notes 30 to 39, wherein
the cell selection criteria include priority related to a cell selection or a cell reselection.

(Supplementary note 41) The cell selection method described in any one of the supplementary notes 30 to 40, wherein
the radio station broadcasts or individually transmits the cell selection criteria to the radio terminal.

(Supplementary note 42) The cell selection method described in any one of the supplementary notes 30 to 41, wherein
the radio station controls at least a first carrier and a second carrier, and
the radio terminal is classified into a first radio terminal having a function to use only the first carrier and a second radio terminal having a function to use the first carrier and the second carrier.

(Supplementary note 43) The cell selection method described in the supplementary note 42, wherein
in a frequency band supported by the second radio terminal, the second radio terminal preferentially selects a cell of the second carrier that satisfies the cell selection criteria.

This application is based upon and claims the benefit of priority of the prior Japanese Patent Application No. 2012-151910, filed on Jul. 5, 2012, the entire contents of which are incorporated herein by reference.

REFERENCE SIGNS LIST

1 radio station
2 radio terminal
10 radio signal receiver
11 demodulation unit
12 transmission unit
13 reception unit
14 control unit
15 signal generation unit
16 radio signal transmitter
20 radio signal receiver
21 demodulation unit
22 recognition unit 23 control unit
24 cell selection unit
25 signal generation unit
26 radio signal transmitter

The invention claimed is:

1. A radio communication system comprising a radio station and a radio terminal,
wherein the radio station comprises at least one processor configured to implement a control unit configured to control a plurality of types of cells by using one radio access technology, which is determined by a radio transmission method, and a memory coupled to the at least one processor; and
wherein the radio terminal comprises:
at least one processor, which is configured to:
implement a recognition unit with which the radio terminal recognizes a type of a serving cell and a type of a neighbor cell by recognizing at least a type of a downlink carrier of the corresponding cell, and
implement a cell selection unit with which the radio terminal selects a target cell in intra the radio access technology based on cell selection criteria, which are configured in accordance with at least either the recognized type of the serving cell or the recognized type of the neighbor cell, and
a memory coupled to the at least one processor.

2. The radio communication system according to claim 1, wherein the type of the downlink carrier is classified by at least one of
a transmission configuration of a transmitted signal,
a configuration of a physical channel, and
contents of the system information.

3. A radio terminal for use in a radio communication system in which a radio station controls a plurality of types of cells by using one radio access technology, which is determined by a radio transmission method, comprising:
at least one processor and a memory coupled to the at least one processor, wherein the at least one processor is configured to:
implement a recognition unit that recognizes a type of a serving cell and a type of a neighbor cell by recognizing at least a type of a downlink carrier of the corresponding cell, and
implement a cell selection unit that selects a target cell in intra the radio access technology based on cell selection criteria, which are configured in accordance with at least either the recognized type of the serving cell or the recognized type of the neighbor cell.

4. The radio terminal according to claim 3, wherein a selection of the cell is a cell selection or a cell reselection in a state in which a radio connection between the radio terminal and the radio station is not established.

5. The radio terminal according to claim 4, wherein the type of the downlink carrier is classified by a transmission configuration of a transmitted signal.

6. The radio terminal according to claim 4, wherein the type of the downlink carrier is classified by a configuration of a physical channel.

7. The radio terminal according to claim 4, wherein the type of the downlink carrier is classified by the transmission configuration of at least any one of a known signal, system information, and a control signal transmitted from the radio station in the carrier.

8. The radio terminal according to claim 4, wherein the type of the downlink carrier is classified by contents of the system information.

9. The radio terminal according to claim 3, wherein the cell selection criteria are received from the radio station.

10. The radio terminal according to claim 3, wherein the radio terminal is classified into a radio terminal having a function to use only a first carrier and a radio terminal having a function to use the first carrier and a second carrier.

11. The radio terminal according to claim 10, wherein
a function to use the first carrier and the second carrier is equipped, and
in a frequency band supported by the radio terminal, the cell selection unit preferentially selects a cell of the second carrier that satisfies the cell selection criteria.

12. A radio station comprising:
at least one processor and a memory coupled to the at least one processor, wherein the at least one processor is configured to implement a control unit that controls a plurality of types of cells by using one radio access technology, which is determined by a radio transmission method, and a unit that broadcasts or individually transmits cell selection criteria in intra the radio access technology to be criteria when a radio terminal selects a target cell between a serving cell and a neighbor cell, a type of the serving cell and a type of the neighbor cell being recognized by the radio terminal by recognizing at least a type of a downlink carrier of the corresponding cell,
wherein the cell selection criteria are configured in accordance with at least either the recognized type of a serving cell or the recognized type of a neighbor cell.

13. A cell selection method comprising:
causing at least one radio station to control a plurality of types of cells by using one radio access technology, which is determined by a radio transmission method;
causing a radio terminal to recognize a type of a serving cell and a type of a neighbor cell by recognizing at least a type of a downlink carrier of the corresponding cell; and
causing the radio terminal to select a target cell in intra the radio access technology based on cell selection criteria, which are configured in accordance with at least either the recognized type of the serving cell or the recognized type of the neighbor cell.

14. The cell selection method according to claim 13, wherein a selection of the cell is a cell selection or a cell reselection in a state in which a radio connection between the radio terminal and the radio station is not established.

15. The cell selection method according to claim 14, wherein the type of the downlink carrier is classified by contents of the system information.

16. The cell selection method according to claim 14, wherein the type of the downlink carrier is classified by a transmission configuration of a transmitted signal.

17. The cell selection method according to claim 14, wherein the type of the downlink carrier is classified by a configuration of a physical channel.

18. The cell selection method according to claim 13, wherein
the radio station controls at least a first carrier and a second carrier, and
the radio terminal is classified into a first radio terminal having a function to use only the first carrier and a second radio terminal having a function to use the first carrier and the second carrier.

19. The cell selection method according to claim 18, wherein in a frequency band supported by the second radio terminal, the second radio terminal preferentially selects a cell of the second carrier that satisfies the cell selection criteria.

\* \* \* \* \*